US012625838B2

(12) United States Patent
Nie

(10) Patent No.: US 12,625,838 B2
(45) Date of Patent: May 12, 2026

(54) RETIMER PATH CONTROL METHOD, APPARATUS, AND SYSTEM

(71) Applicant: HUAWEI TECHNOLOGIES CO., LTD., Shenzhen (CN)

(72) Inventor: Er Nie, Shenzhen (CN)

(73) Assignee: Huawei Technologies Co., Ltd, Shenzhen (CN)

(*) Notice: Subject to any disclaimer, the term of this patent is extended or adjusted under 35 U.S.C. 154(b) by 0 days.

(21) Appl. No.: 18/783,056

(22) Filed: Jul. 24, 2024

(65) Prior Publication Data

US 2024/0378170 A1 Nov. 14, 2024

Related U.S. Application Data

(63) Continuation of application No. PCT/CN2022/074361, filed on Jan. 27, 2022.

(51) Int. Cl.
| | |
|---|---|
| *G06F 13/42* | (2006.01) |
| *G06F 13/40* | (2006.01) |
| *H04L 47/28* | (2022.01) |
| *H04L 47/283* | (2022.01) |

(52) U.S. Cl.
CPC ...... *G06F 13/4282* (2013.01); *G06F 13/4027* (2013.01); *H04L 47/283* (2013.01)

(58) Field of Classification Search
None
See application file for complete search history.

(56) References Cited

U.S. PATENT DOCUMENTS

| | | | | |
|---|---|---|---|---|
| 7,474,612 | B1 * | 1/2009 | Patel | H04J 3/062 |
| | | | | 370/503 |
| 9,965,439 | B2 * | 5/2018 | Das Sharma | G06F 13/4291 |
| 10,129,166 | B2 * | 11/2018 | Shoor | G06F 13/40 |
| 10,606,793 | B2 * | 3/2020 | Das Sharma | G06F 13/4068 |
| 10,673,774 | B2 * | 6/2020 | Shoor | H04L 1/0018 |
| 10,747,688 | B2 | 8/2020 | Jen et al. | |
| 10,979,258 | B1 * | 4/2021 | Chen | H04L 25/0272 |
| 11,397,701 | B2 * | 7/2022 | Das Sharma | G06F 13/4295 |
| 11,683,204 | B2 * | 6/2023 | Chen | H04L 25/03878 |
| | | | | 375/233 |

(Continued)

FOREIGN PATENT DOCUMENTS

| | | |
|---|---|---|
| CN | 113271644 A | 8/2021 |
| CN | 113515384 A | 10/2021 |

(Continued)

*Primary Examiner* — Steven G Snyder
(74) *Attorney, Agent, or Firm* — Leydig, Voit & Mayer, Ltd.

(57) ABSTRACT

A retimer path control method includes: receiving a first bitstream, where the first bitstream includes a first field, the first field includes capability information of a retimer, and the capability information indicates whether the retimer supports a low latency path; and sending a second bitstream to the retimer, where the second bitstream includes a second field, the second field includes first enter control information, the first enter control information indicates whether the retimer enters the low latency path, and the low latency path is a path with lowest latency in data transmission paths of the retimer. The path of the retimer can be effectively controlled.

20 Claims, 18 Drawing Sheets

(56) References Cited

U.S. PATENT DOCUMENTS

| | | | |
|---|---|---|---|
| 11,748,294 B2 * | 9/2023 | Li | G06F 13/4072 |
| | | | 710/305 |
| 2015/0146834 A1 * | 5/2015 | Marshall | H04L 7/0331 |
| | | | 375/376 |
| 2017/0366468 A1 * | 12/2017 | Shoor | H04L 1/0018 |
| 2017/0371831 A1 * | 12/2017 | Das Sharma | G06F 13/4291 |
| 2018/0181502 A1 * | 6/2018 | Jen | G06F 13/4022 |
| 2018/0253397 A1 * | 9/2018 | Das Sharma | G06F 13/4068 |
| 2019/0028398 A1 * | 1/2019 | Shoor | H04L 25/03273 |
| 2019/0065426 A1 * | 2/2019 | Das Sharma | G06F 13/4027 |
| 2019/0258600 A1 * | 8/2019 | Das Sharma | G06F 11/0778 |
| 2020/0280428 A1 | 9/2020 | Kovacs et al. | |
| 2021/0263879 A1 * | 8/2021 | Li | H04L 25/03866 |
| 2022/0123972 A1 * | 4/2022 | Chen | H04L 25/03866 |
| 2023/0170934 A1 * | 6/2023 | Gupta | H03K 17/6872 |
| | | | 375/211 |
| 2023/0396315 A1 * | 12/2023 | Horn | H04W 74/0833 |
| 2024/0089039 A1 * | 3/2024 | Dallal | H04L 5/0023 |

FOREIGN PATENT DOCUMENTS

| | | | |
|---|---|---|---|
| CN | 112840593 B | 5/2022 |
| EP | 3734463 A2 | 11/2020 |
| EP | 3859541 A1 | 8/2021 |
| WO | 2019005391 A1 | 1/2019 |
| WO | 2021147005 A1 | 7/2021 |

* cited by examiner

10

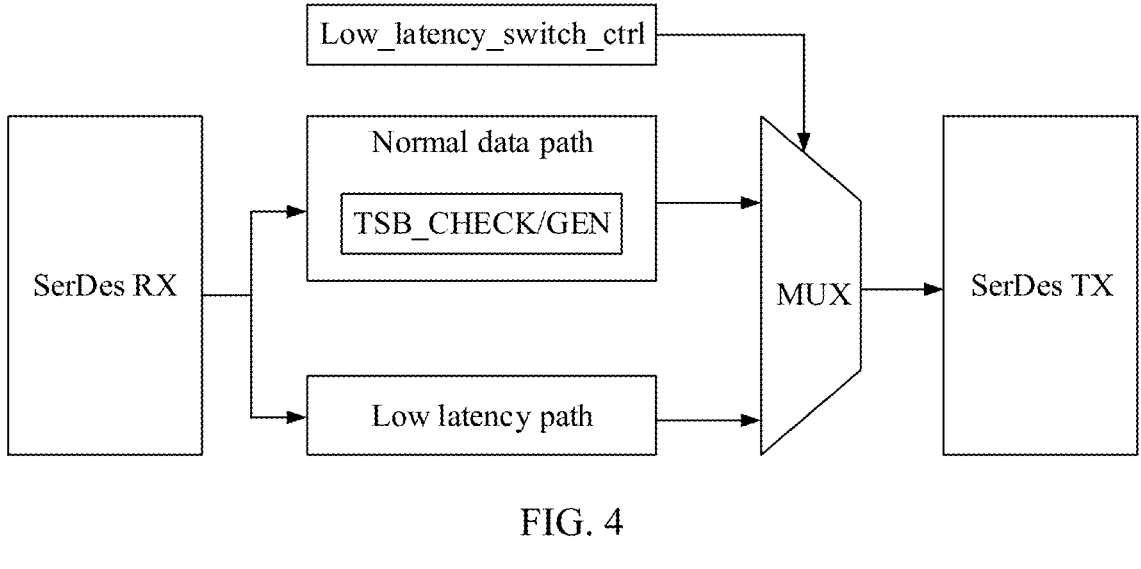
FIG. 4
| TSB type | TSB payload | TSB payload | TSB CRC |
|---|---|---|---|
FIG. 5
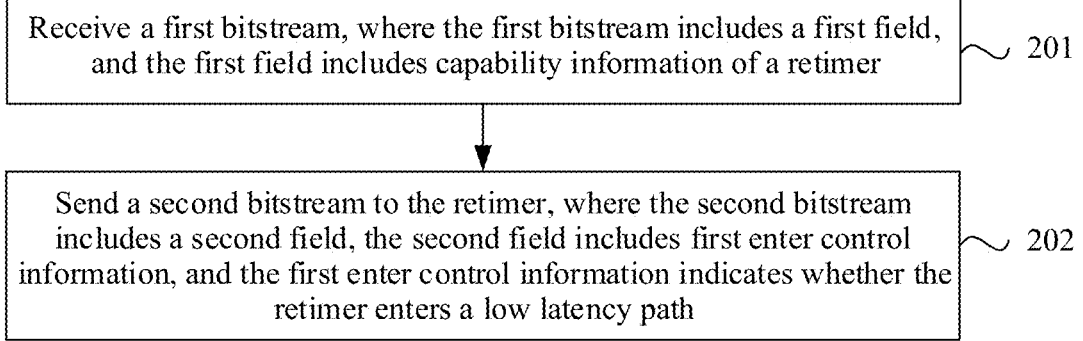
FIG. 6

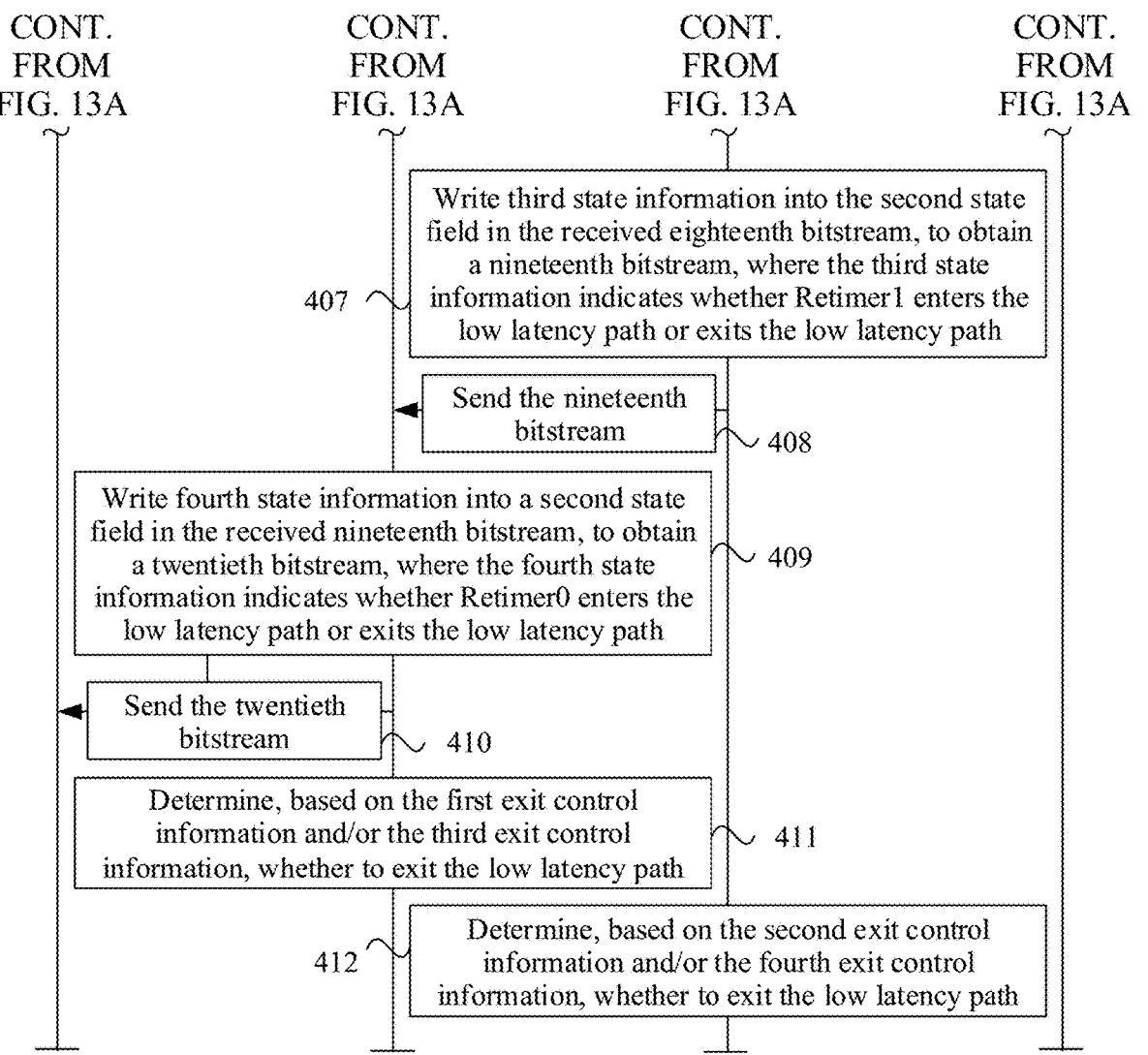

CONT.
FROM
FIG. 13A

CONT.
FROM
FIG. 13A

CONT.
FROM
FIG. 13A

CONT.
FROM
FIG. 13A

407 — Write third state information into the second state field in the received eighteenth bitstream, to obtain a nineteenth bitstream, where the third state information indicates whether Retimer1 enters the low latency path or exits the low latency path Send the nineteenth bitstream — 408

Write fourth state information into a second state field in the received nineteenth bitstream, to obtain a twentieth bitstream, where the fourth state information indicates whether Retimer0 enters the low latency path or exits the low latency path — 409

Send the twentieth bitstream — 410

Determine, based on the first exit control information and/or the third exit control information, whether to exit the low latency path — 411

412 — Determine, based on the second exit control information and/or the fourth exit control information, whether to exit the low latency path

FIG. 13B

RETIMER PATH CONTROL METHOD, APPARATUS, AND SYSTEM

CROSS-REFERENCE TO RELATED APPLICATIONS

This application is a continuation of International Application No. PCT/CN2022/074361, filed on Jan. 27, 2022, which is hereby incorporated by reference in its entirety.

TECHNICAL FIELD

This application relates to the field of communication technologies, and in particular, to a retimer path control method, apparatus, and system.

BACKGROUND

With development of a high-speed serial link technology, an insertion loss (IL) of a communication device is ever-increasing. Excessively large IL may cause a high loss in data transmission and a large link jitter. Currently, a retimer is usually connected between two connected communication devices. The retimer performs a series of processing on received data, to perform relay, amplification, and forwarding on the data and filter out jitter of a communication link.

The series of processing performed by the retimer on the received data is usually complex. As a result, data transmission latency exists in the retimer, and data transmission efficiency is affected. Therefore, to reduce the data transmission latency in the retimer, a retimer having a low latency path may be used, so that the retimer forwards the data in the low latency path.

For the retimer having the low latency path, the retimer needs to be controlled to enter or exit the low latency path. Therefore, there is an urgent need for an effective retimer path control method.

SUMMARY

This application provides a retimer path control method, apparatus, and system, to effectively control a retimer path.

According to a first aspect, this application provides a retimer path control method for wired serial data transmission. The method includes: receiving a first bitstream, where the first bitstream includes a first field, the first field includes capability information of a retimer, and the capability information indicates whether the retimer supports a low latency path; and sending a second bitstream to the retimer. The second bitstream includes a second field. The second field includes first enter control information. The first enter control information indicates whether the retimer enters the low latency path. The low latency path is a path with lowest latency in data transmission paths of the retimer.

In a related technology, before entering the low latency path in a communication link establishment phase, the retimer sends an indication bitstream to two connected communication devices, to indicate the two communication devices to stay in the communication link establishment phase and not to enter a service data transmission phase. Then the retimer independently enters the low latency path. After a communication link is established, the retimer forwards data through the low latency path. Peripheral Component Interconnect Express (PCIe)-based wired serial data transmission is used as an example, and the indication bitstream may be a non-PCIe bitstream. However, in the related technology, some communication devices may become abnormal after receiving the indication bitstream sent by the retimer, and affects a communication process.

In the retimer path control method for wired serial data transmission provided in this embodiment of this application, a device may determine, based on the first bitstream, whether the retimer supports the low latency path, and then control the path of the retimer based on the second bitstream, so that the retimer can determine, based on the second bitstream, whether to enter the low latency path. In this case, the retimer may not independently enter the low latency path, thereby effectively controlling the path of the retimer, and the retimer may not send the indication bitstream to the communication device, thereby preventing the device from becoming abnormal caused by the indication bitstream.

Optionally, the first bitstream and the second bitstream each may be a training set block (TSB). The bitstream is obtained by adding a field to an existing TSB without changing a format of the existing TSB. In this way, the method can be applied to a high-speed input/output (I/O) protocol. An apparatus to which the method is applied can be directly expanded to a high-speed serial interface, for example, can be expanded to a high-speed serial computer expansion bus standard (PCIe) interface and an Ethernet interface, to implement native interconnection with the retimer, and effectively control paths of retimers having different types of low latency paths. The method is widely applicable without affecting other functions and features of the retimers. In addition, the TSB does not cause abnormality of the first device or second device.

In the following second embodiment, the first bitstream is equivalent to a sixth bitstream, the first field is equivalent to a second capability field, the second bitstream is equivalent to a ninth bitstream or a fifteenth bitstream, and the second field is equivalent to a first path control field.

In the following third embodiment, the first bitstream is equivalent to a third bitstream, the first field is equivalent to a second capability field, the second bitstream is equivalent to a seventh bitstream or an eleventh bitstream, and the second field is equivalent to a first path control field.

In a possible implementation, the second field further includes first exit control information, and the first exit control information indicates whether the retimer exits the low latency path. In this way, the retimer can determine, based on the second bitstream, whether to exit the low latency path. When a status of the communication link is poor, the retimer may be controlled to exit the low latency path, so that an equalization state of the link establishment phase is re-entered, and equalization of the link is performed in the equalization state, that is, an equalization feature is redone, thereby ensuring that the communication link is in a good state.

In a possible implementation, the method further includes: sending a third bitstream to the retimer. The third bitstream includes a third field. The third field carries the capability information.

In the following second embodiment, the third bitstream is equivalent to a first bitstream, and the third field is equivalent to a first capability field.

In the following third embodiment, the third bitstream is equivalent to a first bitstream, and the third field is equivalent to a first capability field.

In a possible implementation, the method further includes: receiving a fourth bitstream. The fourth bitstream includes a fourth field. The fourth field includes second enter control information and second exit control information. The second enter control information indicates whether the retimer enters the low latency path. The second exit control information indicates whether the retimer exits the low latency path.

In the following second embodiment, the fourth bitstream is equivalent to a fourteenth bitstream or a twentieth bitstream, and the fourth field is equivalent to a second path control field.

In the following third embodiment, the fourth bitstream is equivalent to a tenth bitstream or a fourteenth bitstream, and the fourth field is equivalent to a second path control field.

In a possible implementation, the second bitstream further includes a fifth field. The fifth field carries state information. The state information indicates whether the retimer enters the low latency path or exits the low latency path.

In the following second embodiment, the fifth field is equivalent to a first state field. In the following third embodiment, the fifth field is equivalent to a first state field.

In a possible implementation, the fourth bitstream further includes a sixth field, and the sixth field includes the state information.

In the following second embodiment, the sixth field is equivalent to a second state field. In the following third embodiment, the sixth field is equivalent to a second state field.

In a possible implementation, the method further includes: sending service data to a peer device through the retimer when it is determined, based on the state information, that the retimer does not enter the low latency path or exit the low latency path.

A local device may determine, based on the state information carried in the received fourth bitstream, whether the retimer completes entering the low latency path or exiting the low latency path. The peer device may also determine, based on the state information carried in the received second bitstream, whether the retimer completes entering the low latency path or exiting the low latency path. In a path control process of the retimer, the local device and the peer device are required to wait for the retimer to enter or exit the low latency path. The local device and the peer device may determine, based on the respective state information received by the local device and the peer device, whether to end this waiting process, and determine whether to perform subsequent service data transmission or whether to re-perform a link establishment process. This avoids a case in which the local device and the peer device stay in the waiting process, and avoids timeout in establishment of the communication link between the local device and the peer device.

In a possible implementation, the first bitstream further includes a seventh field, the seventh field includes duration information, and the duration information indicates consumed duration for the retimer to enter or exit the low latency path.

In the following second embodiment, the seventh field is equivalent to a second time field. In the following third embodiment, the seventh field is equivalent to a second time field.

In a possible implementation, after the sending a second bitstream to the retimer, the method further includes: determining waiting duration based on the duration information; and sending the service data to the peer device through the retimer when a first quantity of fourth bitstreams are received after the waiting duration following a start moment.

The local device may directly determine the waiting duration based on the duration information carried in the received first bitstream. After the waiting duration expires, the local device may stop waiting for the retimer to enter or exit the low latency path. This avoids a case in which the local device stays in the waiting process, and effectively avoids the timeout in establishment of the communication link between the local device and the peer device.

In a possible implementation, the method further includes: sending a fifth bitstream to the retimer. The fifth bitstream includes an eighth field. The eighth field includes first enable information. The first enable information indicates whether the retimer enables the low latency path.

In the following second embodiment, the fifth bitstream is equivalent to a seventh bitstream, and the eighth field is equivalent to a first enable field. In the following third embodiment, the fifth bitstream is equivalent to a fifth bitstream, and the eighth field is equivalent to a first enable field.

Enabling the low latency path indicates making preparations for entering the low latency path, for example, calibration and clock phase alignment.

In a possible implementation, the method further includes: receiving a sixth bitstream. The sixth bitstream includes a ninth field. The ninth field includes second enable information. The second enable information indicates whether to enable the low latency path.

In the following second embodiment, the sixth bitstream is equivalent to an eighth bitstream, and the ninth field is equivalent to a second enable field. In the following third embodiment, the sixth bitstream is equivalent to a sixth bitstream, and the ninth field is equivalent to a second enable field.

In embodiments of this application, the first enable information and the second enable information may be the same or different. In a possible implementation, the method further includes: when the second enable information is different from the first enable information, updating the first enable information based on the second enable information, to obtain updated first enable information, where the updated first enable information is the same as the second enable information; and sending an updated fifth bitstream to the retimer. The updated fifth bitstream includes an updated first enable field, and the updated first enable field includes the updated first enable information.

The updated first enable information is the same as the second enable information, that is, enable information carried in bitstreams sent by the devices at the two ends is consistent. In this way, the retimer can determine, based on any enable information, whether to enable the low latency path, and may not start to determine whether to enable the low latency path only after receiving the first enable information and the second enable information, thereby improving efficiency of the retimer to determine whether to enable the low latency path, and improving path control efficiency.

In a possible implementation, the receiving a first bitstream includes: receiving the first bitstream in a first state. The sending a third bitstream to the retimer includes: sending the third bitstream to the retimer in the first state. The method further includes: jumping from the first state to a second state when a second quantity of first bitstreams are received. The sending a fifth bitstream to the retimer includes: sending the fifth bitstream to the retimer in the second state. The receiving a sixth bitstream includes: receiving the sixth bitstream in the second state. The method further includes: jumping from the second state to a third state when a third quantity of sixth bitstreams are received. The sending a second bitstream to the retimer includes: sending the second bitstream to the retimer in the third state. The receiving a fourth bitstream includes: receiving the fourth bitstream in the third state.

For example, the first state may be a discovery state, the second state may be a configuration state, and the third state may be a retrain state.

In a possible implementation, the method further includes: determining the first enter control information based on the capability information. For example, if it is determined, based on the capability information, that the retimer supports a low latency path, the first enter control information indicating the retimer to enter the low latency path may be determined. If it is determined, based on the capability information, that the retimer does not support the low latency, the first enter control information indicating the retimer not to enter the low latency path may be determined.

In a possible implementation, the method further includes: obtaining enable configuration information of the retimer, where the enable configuration information indicates whether to enable a low latency capability of the retimer. The determining the first enter control information based on the capability information includes: determining the first enter control information based on the capability information and the enable configuration information. The enable configuration information may be preconfigured in the device, and flexibility of retimer path control may be improved based on the enable configuration information.

According to a second aspect, this application provides a retimer path control method for wired serial data transmission. The method includes: receiving a first bitstream sent by a first device, where the first bitstream includes a first field; writing capability information into the first field to obtain a second bitstream, where the capability information indicates whether a retimer supports a low latency path, and the low latency path is a path with lowest latency in data transmission paths of the retimer; sending the second bitstream to a second device; receiving a third bitstream sent by the second device, where the third bitstream includes a second field, and the second field includes first enter control information; and determining, based on the first enter control information, whether to enter the low latency path.

In the method, the retimer may send the capability information to the second device, so that the second device sends the third bitstream to the retimer based on the capability information, and determines, based on the third bitstream, whether to enter the low latency path. The retimer may not independently enter the low latency path. The first device and the second device can effectively control the path of the retimer.

Before the retimer writes the capability information into the first field, the first field may include default capability information. The retimer may first decode the received first bitstream, and then determine, based on whether the retimer supports the low latency, whether the capability information is the same as the default capability information. When the capability information is the same as the default capability information, content in the first field may not be modified. In this case, the obtained second bitstream is the same as the first bitstream. When the capability information is different from the default capability information, content in the first field is required to be modified to the capability information. In this case, the second bitstream is different from the first bitstream.

A normal data transmission path and the low latency path of the retimer each include two paths respectively corresponding to two transmission directions. When it is determined, based on the first enter control information, whether to enter the low latency path, it may be determined, based on the first enter control information, whether to enter both the two low latency paths.

In the following second embodiment, the first bitstream is equivalent to the first bitstream or a second bitstream, the first field is equivalent to the first capability field, and the second bitstream is equivalent to the second bitstream or a third bitstream. When the first bitstream is equivalent to the first bitstream in the following second embodiment, the second bitstream is equivalent to the second bitstream in the following second embodiment. When the first bitstream is equivalent to the second bitstream in the following second embodiment, the second bitstream is equivalent to the third bitstream in the following second embodiment. In the following second embodiment, the third bitstream is equivalent to a twelfth bitstream, a thirteenth bitstream, an eighteenth bitstream, or a nineteenth bitstream, and the second field is equivalent to the second path control field.

In the following third embodiment, the first bitstream is equivalent to the first bitstream, the first field is equivalent to the first capability field, the second bitstream is equivalent to a second bitstream, the third bitstream is equivalent to a ninth bitstream or a thirteenth bitstream, and the second field is equivalent to the second path control field.

In a possible implementation, the second field further includes first exit control information, and the method further includes: determining, based on the first exit control information, whether to exit the low latency path. The retimer may determine, based on the second bitstream, whether to exit the low latency path. When a status of a communication link is poor, the low latency path may be exited, so that an equalization state of the link establishment phase is re-entered, and equalization of the link is performed in the equalization state, that is, an equalization feature is redone, thereby ensuring that the communication link is in a good state.

In a possible implementation, the method further includes: receiving a fourth bitstream sent by the second device, where the fourth bitstream includes a third field; writing the capability information into the third field to obtain a fifth bitstream; sending the fifth bitstream to the first device; and receiving a sixth bitstream sent by the first device, where the sixth bitstream includes a fourth field, and the fourth field includes second enter control information. The determining, based on the first enter control information, whether to enter the low latency path includes: determining, based on the first enter control information and the second enter control information, whether to enter the low latency path.

For example, the retimer may determine, based on the first enter control information and the second enter control information, whether to enter both the two low latency paths. Optionally, the retimer may perform an AND logical operation or an OR logical operation on the first enter control information and the second enter control information, and determine, based on a result of the AND logical operation or the OR logical operation, whether to enter both the two low latency paths.

For another example, the retimer may separately and independently determine, based on the first enter control information and the second enter control information, whether to enter the two low latency paths. In other words, the retimer may determine, based on the first enter control information, whether to enter one low latency path, and determine, based on the second enter control information, whether to enter the other low latency path. Optionally, the first path control field may further include first direction information, and the second path control field may further include second direction information. The first direction information is different from the second direction information. The first direction information indicates a transmission direction corresponding to a low latency path entered based on the first enter control information. The second direction information indicates a transmission direction corresponding to a low latency path entered based on the second enter control information. The retimer may determine, based on the first enter control information, whether to enter the low latency path corresponding to the transmission direction indicated by the first direction information, and determine, based on the second enter control information, whether to enter the low latency path corresponding to the transmission direction indicated by the second direction information.

Still optionally, the retimer may directly determine, based on the first enter control information, whether to enter a low latency path corresponding to a transmission direction of the third bitstream, and determine, based on the second enter control information, whether to enter a low latency path corresponding to a transmission direction of the sixth bitstream.

In the following second embodiment, the fourth bitstream is equivalent to a fourth bitstream or a fifth bitstream, the third field is equivalent to the second capability field, and the fifth bitstream is equivalent to the fifth bitstream or the sixth bitstream. When the fourth bitstream is equivalent to the fourth bitstream in the following second embodiment, the fifth bitstream is equivalent to the fifth bitstream in the following second embodiment. When the fourth bitstream is equivalent to the fifth bitstream in the following second embodiment, the fifth bitstream is equivalent to the sixth bitstream in the following second embodiment. In the following second embodiment, the sixth bitstream is equivalent to a ninth bitstream, a tenth bitstream, a fifteenth bitstream, or a sixteenth bitstream, and the fourth field is equivalent to the first path control field.

In the following third embodiment, the fourth bitstream is equivalent to the third bitstream, the third field is equivalent to the second capability field, the fifth bitstream is equivalent to a fourth bitstream, the sixth bitstream is equivalent to a seventh bitstream or an eleventh bitstream, and the fourth field is equivalent to the first path control field.

In a possible implementation, the fourth field further includes second exit control information, and the determining, based on the first exit control information, whether to exit the low latency path includes: determining, based on the first exit control information and the second exit control information, whether to exit the low latency path.

In a possible implementation, the third bitstream further includes a fifth field, the sixth bitstream further includes a sixth field, and the method further includes: writing state information into the fifth field to obtain a seventh bitstream, where the state information indicates whether the retimer enters the low latency path or exits the low latency path; sending the seventh bitstream to the first device; writing the state information into the sixth field to obtain an eighth bitstream; and sending the eighth bitstream to the second device.

In the following second embodiment, the fifth field is equivalent to the second state field, the sixth field is equivalent to the first state field, and the seventh bitstream is equivalent to the thirteenth bitstream, a fourteenth bitstream, the nineteenth bitstream, or a twentieth bitstream. When the third bitstream is equivalent to the twelfth bitstream in the following second embodiment, the seventh bitstream is equivalent to the thirteenth bitstream in the following second embodiment. When the third bitstream is equivalent to the thirteenth bitstream in the following second embodiment, the seventh bitstream is equivalent to the fourteenth bitstream in the following second embodiment. When the third bitstream is equivalent to an eighteenth bitstream in the following second embodiment, the seventh bitstream is equivalent to the nineteenth bitstream in the following second embodiment. When the third bitstream is equivalent to the nineteenth bitstream in the following second embodiment, the seventh bitstream is equivalent to the twentieth bitstream in the following second embodiment.

The eighth bitstream is equivalent to the tenth bitstream, an eleventh bitstream, the sixteenth bitstream, or a seventeenth bitstream in the following second embodiment. When the sixth bitstream is equivalent to the ninth bitstream in the following second embodiment, the eighth bitstream is equivalent to the tenth bitstream in the following second embodiment. When the sixth bitstream is equivalent to the tenth bitstream in the following second embodiment, the eighth bitstream is equivalent to the eleventh bitstream in the following second embodiment. When the sixth bitstream is equivalent to the fifteenth bitstream in the following second embodiment, the eighth bitstream is equivalent to the sixteenth bitstream in the following second embodiment. When the sixth bitstream is equivalent to the sixteenth bitstream in the following second embodiment, the eighth bitstream is equivalent to the seventeenth bitstream in the following second embodiment.

In the following third embodiment, the fifth field is equivalent to the second state field, the sixth field is equivalent to the first state field, the seventh bitstream is equivalent to the tenth bitstream or the fourteenth bitstream, and the eighth bitstream is equivalent to an eighth bitstream or a twelfth bitstream.

Before the retimer writes the state information into the fifth field, the fifth field may include default state information. The retimer may first decode the received third bitstream, and then determine, based on a current state of the retimer, whether the state information is the same as the default state information. When the state information is the same as the default state information, content in the fifth field may not be modified. In this case, the obtained seventh bitstream is the same as the third bitstream. When the state information is different from the default state information, content in the fifth field is required to be modified to the state information. In this case, the seventh bitstream is different from the third bitstream.

The first device may determine, based on the state information carried in the received seventh bitstream, whether the retimer completes entering the low latency path or exiting the low latency path. The second device may also determine, based on the state information carried in the received eighth bitstream, whether the retimer completes entering the low latency path or exiting the low latency path. In a path control process of the retimer, the first device and the second device are required to wait for the retimer to enter or exit the low latency path. The first device and the second device may determine, based on the respective state information received by the first device and the second device, whether to end this waiting process, and determine whether to perform subsequent service data transmission or whether to re-perform a link establishment process. This avoids a case in which the first device and the second device stay in the waiting process, and avoids timeout in establishment of the communication link between the first device and the second device.

In a possible implementation, the first bitstream further includes a seventh field, and the fourth bitstream further includes an eighth field. The writing capability information into the first field to obtain a second bitstream includes:

writing the capability information into the first field and writing duration information into the seventh field, to obtain the second bitstream, where the duration information indicates consumed duration for the retimer to enter or exit the low latency path. The writing the capability information into the third field to obtain a fifth bitstream includes: writing the capability information into the third field and writing the duration information into the eighth field, to obtain the fifth bitstream.

Before the retimer writes the duration information into the seventh field, the seventh field may include default duration information. The retimer may first decode the received first bitstream, and then determine whether the duration information is the same as the default duration information. If the duration information is the same as the default duration information, the default duration information may not be modified. If the duration information is different from the default duration information, the default duration information is required to be modified to the duration information.

In the following second embodiment, the seventh field is equivalent to a first time field, and the eighth field is equivalent to a second time field. In the following third embodiment, the seventh field is equivalent to a first time field, and the eighth field is equivalent to a second time field.

In a possible implementation, the method further includes: receiving a ninth bitstream sent by the second device, where the ninth bitstream includes a ninth field, and the ninth field includes first enable information; and determining, based on the first enable information, whether to enable the low latency path.

A normal data transmission path and the low latency path of the retimer each include two paths respectively corresponding to two transmission directions. When it is determined, based on the first enable information, whether to enable the low latency path, it may be determined, based on the first enable information, whether to enable both the two low latency paths.

In the following second embodiment, the ninth bitstream is equivalent to the eighth bitstream, and the ninth field is equivalent to the second enable field. In the following third embodiment, the ninth bitstream is equivalent to the sixth bitstream, and the ninth field is equivalent to the second enable field.

In a possible implementation, the method further includes: receiving a tenth bitstream sent by the first device, where the tenth bitstream includes a tenth field, and the tenth field includes second enable information. The determining, based on the first enable information, whether to enable the low latency path includes: determining, based on the first enable information and the second enable information, whether to enable the low latency path.

For example, the retimer may determine, based on the first enable information and the second enable information, whether to enable both the two low latency paths. Optionally, the retimer may perform an AND logical operation or an OR logical operation on the first enable information and the second enable information, and determine, based on a result of the AND logical operation or the OR logical operation, whether to enable both the two low latency paths.

For another example, the retimer may separately and independently determine, based on the first enable information and the second enable information, whether to enable the two low latency paths. In other words, the retimer may determine, based on the first enable information, whether to enable one low latency path, and determine, based on the second enable information, whether to enable the other low latency path. Optionally, a first enable field may further include first direction information, and a second enable field may further include second direction information. The retimer may determine, based on the first enable information, whether to enable a low latency path corresponding to a transmission direction indicated by the first direction information, and determine, based on the second enable information, whether to enable a low latency path corresponding to a transmission direction indicated by the second direction information.

Still optionally, the retimer may directly determine, based on the first enable information, whether to enable a low latency path corresponding to a transmission direction of the ninth bitstream, and determine, based on the second enable information, whether to enable a low latency path corresponding to a transmission direction of the tenth bitstream.

In the following second embodiment, the tenth bitstream is equivalent to the seventh bitstream, and the tenth field is equivalent to the first enable field. In the following third embodiment, the tenth bitstream is equivalent to the fifth bitstream, and the tenth field is equivalent to the first enable field.

According to a third aspect, this application provides a retimer path control apparatus for wired serial data transmission, including: one or more processors; and a memory, configured to store one or more computer programs or instructions. When the one or more computer programs or the instructions are executed by the one or more processors, the one or more processors are enabled to implement the method according to the first aspect.

According to a fourth aspect, this application provides a retimer path control apparatus for wired serial data transmission, including: one or more processors; and a memory, configured to store one or more computer programs or instructions. When the one or more computer programs or the instructions are executed by the one or more processors, the one or more processors are enabled to implement the method according to the second aspect.

According to a fifth aspect, this application provides a retimer path control apparatus for wired serial data transmission, including a processor, configured to perform the method according to the first aspect.

According to a sixth aspect, this application provides a retimer path control apparatus for wired serial data transmission, including a processor, configured to perform the method according to the second aspect.

According to a seventh aspect, this application provides a computer-readable storage medium, including a computer program or instructions. When the computer program or the instructions are executed on a computer, the computer is enabled to perform the method according to the first aspect or the second aspect.

According to an eighth aspect, this application provides a retimer path control system for wired serial data transmission. The system includes a first device, a second device, and a retimer. The first device or the second device includes the retimer path control apparatus for wired serial data transmission according to the third aspect or the fifth aspect. The retimer includes the retimer path control apparatus for wired serial data transmission according to the fourth aspect or the sixth aspect.

BRIEF DESCRIPTION OF DRAWINGS

FIG. 4 is a diagram of a structure of a physical layer of a retimer according to an embodiment of this application;

FIG. 5 is a diagram of a structure of a TSB according to an embodiment of this application;

FIG. 6 is a schematic flowchart of a retimer path control method for wired serial data transmission according to an embodiment of this application;

FIG. 13A and FIG. 13B are a schematic flowchart of still another retimer path control method for wired serial data transmission according to an embodiment of this application;

DESCRIPTION OF EMBODIMENTS

Figure 1:
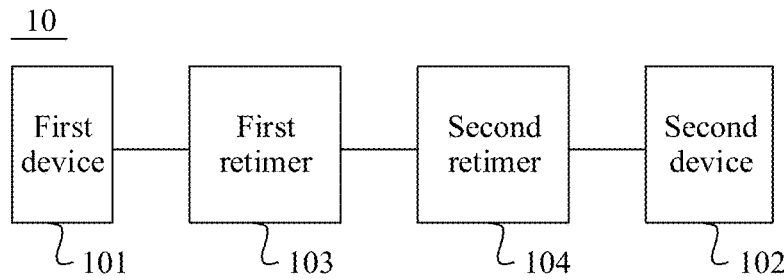
FIG. 1 is a diagram of a structure of a communication system according to an embodiment of this application.

To make objectives, technical solutions, and advantages of this application clearer, the following clearly describes technical solutions in this application with reference to the accompanying drawings in this application. It is clear that the described embodiments are merely some rather than all of embodiments of this application. All other embodiments obtained by a person of ordinary skill in the art based on embodiments of this application without creative efforts may fall within the protection scope of this application.

In the specification, embodiments, claims, and accompanying drawings of this application, the terms "first", "second", and the like are merely intended for distinguishing and description, and shall not be understood as indicating or implying relative importance, or indicating or implying a sequence. In addition, the terms "include", "have", and any variant thereof are intended to cover non-exclusive inclusion, for example, include a series of steps or units. Methods, systems, products, or devices are not necessarily limited to those steps or units that are literally listed, but may include other steps or units that are not literally listed or that are inherent to such processes, methods, products, or devices.

It should be understood that in this application, "at least one (item)" means one or more and "a plurality of" means two or more. The term "and/or" is used for describing an association relationship between associated objects, and represents that three relationships may exist. For example, "A and/or B" may represent the following three cases: Only A exists, only B exists, and both A and B exist, where A and B may be singular or plural. The character "/" generally indicates an "or" relationship between the associated objects. The expression "at least one of the following items (pieces)" or a similar expression means any combination of these items, including a single item (piece) or any combination of a plurality of items (pieces). For example, at least one of a, b, or c may indicate a, b, c, a and b, a and c, b and c, or a, b, and c, where a, b, and c may be singular or plural.

In a process of wired serial data transmission (for example, wired serial data transmission on a high-speed serial channel), a retimer is required to be used to ensure data transmission quality. The retimer may be considered as a physical chip. The retimer is connected in series between two connected communication devices, and is configured to forward data between the two communication devices. The two communication devices may transmit data through a serial I/O interface. When the data passes through the retimer, the retimer performs a series of processing such as data processing (for example, asynchronization and frequency offset elimination, code block alignment, de-scrambling, and data alignment), modification, scrambling, and coding on the data, to perform relay, amplification, and forwarding on the data and filter out a jitter of a communication link.

FIG. 1 is a diagram of a structure of a communication system according to an embodiment of this application. The communication system 10 includes a first device 101, a second device 102, and at least one retimer. FIG. 1 shows a first retimer 103 and a second retimer 104. Wired serial data transmission may be performed between the first device 101, the at least one retimer, and the second device 102. PCIe-based wired serial data transmission is used as an example. The first device 101 may include a root complex (RC) device. The second device 102 may include an endpoint (EP). Data may be transmitted between the RC device and the EP device through a high-speed serial I/O.

Figure 2:
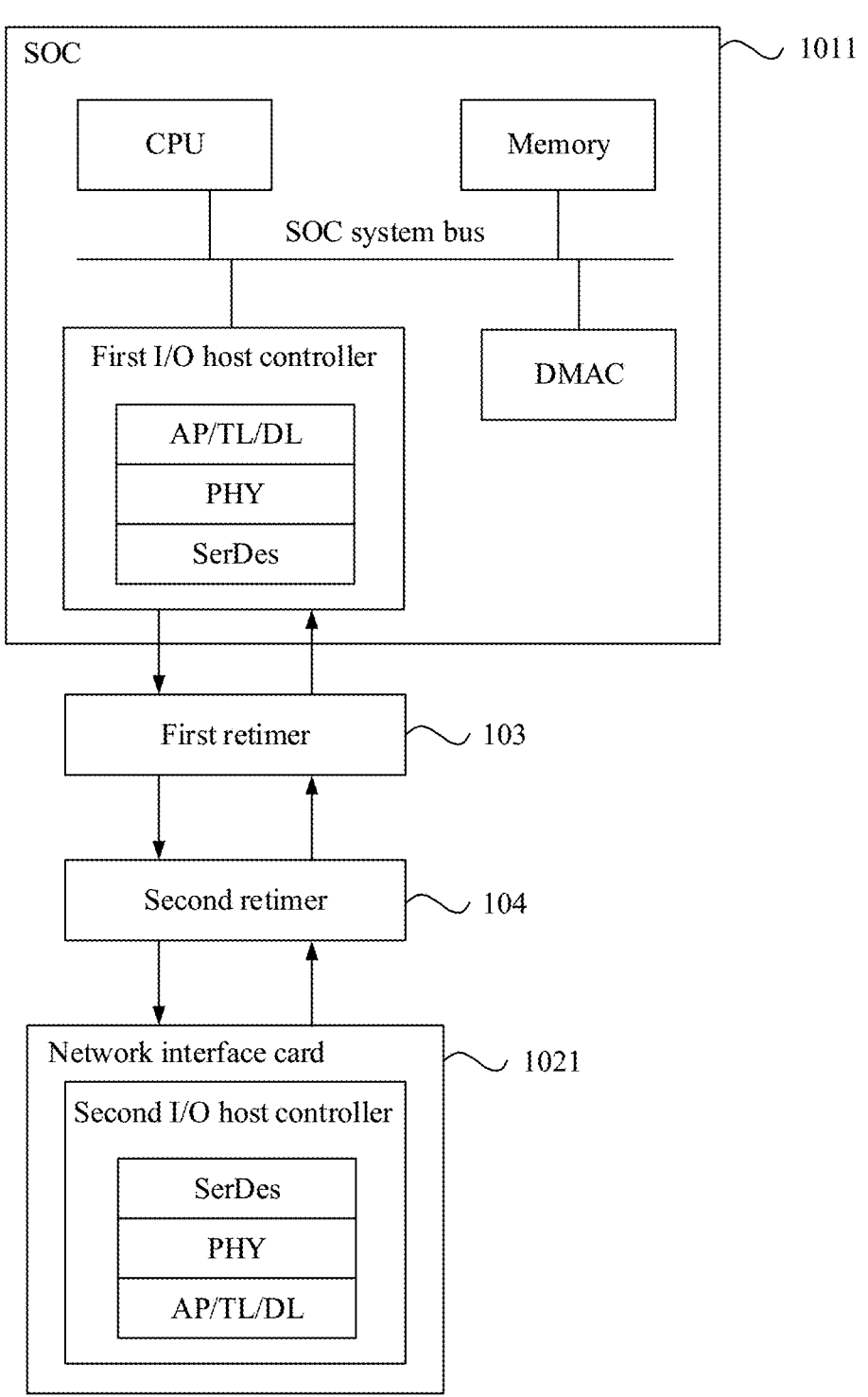
FIG. 2 is a diagram of a structure of another communication system according to an embodiment of this application.

Optionally, the first device 101 may include a system on chip (SoC), and the second device 102 may include a network interface card. FIG. 2 is a diagram of a structure of another communication system according to an embodiment of this application. FIG. 2 shows an SoC 1011 included in a first device and a network interface card 1021 included in a second device 102. The SoC 1011 is connected to the network interface card 1021 through a high-speed serial interface, to implement communication with an external network.

The SoC 1011 includes a first I/O host controller, a direct memory access controller (DMAC), a central processing unit (CPU), and a memory that are connected through a system bus. The network interface card 1021 includes a second I/O host controller. The first I/O host controller or the second I/O host controller includes an application layer (AP)/a transport layer (TL)/a data link layer (DL), a physical layer (PHY), and a serializer/deserializer (SerDes). The first I/O host controller and the second I/O host controller are connected by using their respective SerDes.

In a data transmission process between the first device 101 and the second device 102, for example, data is transmitted from the first device 101 to the second device, a plurality of paths of parallel data sequentially pass through the AP/TL/DL, the PHY, and the SerDes in the first I/O host controller, and the SerDes converts the plurality of paths of parallel data into wired serial data. The wired serial data is sequentially transmitted to the network interface card 1021 through the first retimer 103 and the second retimer 104. The SerDes in the network interface card 1021 converts the wired serial data into a plurality of paths of parallel data. With an increasing rate of the SerDes, ILs of the first device 101 and the second device 102 are also increasing. When the ILs exceed a driving capability of the SerDes, both a data transmission loss and a jitter of the communication link are large. The first retimer 103 and the second retimer 104 may implement relay, amplification, and forwarding of received data and filter out the jitter of the communication link by performing a series of processing on the data.

A process of a series of processing performed by the retimer on the received data are complex. As a result, transmission latency of the data in the retimer is large, and the transmission latency is usually greater than 40 nanoseconds (ns). Consequently, data transmission efficiency is low, and service performance in a latency-sensitive scenario is greatly affected. Currently, a retimer having a low latency path is usually used, so that the retimer forwards data in the low latency path, thereby reducing transmission latency of the data in the retimer. For the retimer with the low latency path, the retimer is required to be controlled to enter or exit the low latency path in a communication link establishment phase (that is, before service data transmission).

In a related technology, before entering the low latency path in the communication link establishment phase, the retimer sends an indication bitstream to the two connected communication devices, to indicate the two communication devices to stay in the communication link establishment phase and not to enter a service data transmission phase. Then the retimer independently enters the low latency path. After a communication link is established, the retimer forwards the data through the low latency path. PCIe-based wired serial data transmission is used as an example, and the indication bitstream may be a non-PCIe bitstream.

However, in the related technology, in a process in which the retimer enters the low latency path, the two communication devices cannot interact with each other. As a result, whether the retimer completes entering the low latency path or exiting the low latency path cannot be determined. Consequently, a waiting process of the two communication devices takes a long period of time, resulting in timeout in establishment of the communication link between the two communication devices. In addition, some communication devices may become abnormal after receiving the indication bitstream sent by the retimer. Further, in the related technology, after entering the low latency path, the retimer keeps transmitting the data through the low latency path, that is, cannot exit the low latency path. Consequently, when a status of the communication link is poor, an equalization state of the link establishment phase cannot be re-entered, and equalization of the link cannot be performed in the equalization state, that is, an equalization feature cannot be re-performed.

An embodiment of this application provides a retimer path control method for wired serial data transmission, so that a retimer can be effectively controlled in a link training phase based on a bitstream, to enter or exit a low latency path. The bitstream may include, for example, a TSB. The method may be applied to the communication system shown in FIG. 1 or FIG. 2. For example, the method may be applied to the following four components shown in FIG. 2: the first I/O host controller, the first retimer 103, the second retimer 104, and the second I/O host controller, for example, may be applied to a physical layer of these components. The following describes structures of physical layers of the components.

Figure 3:
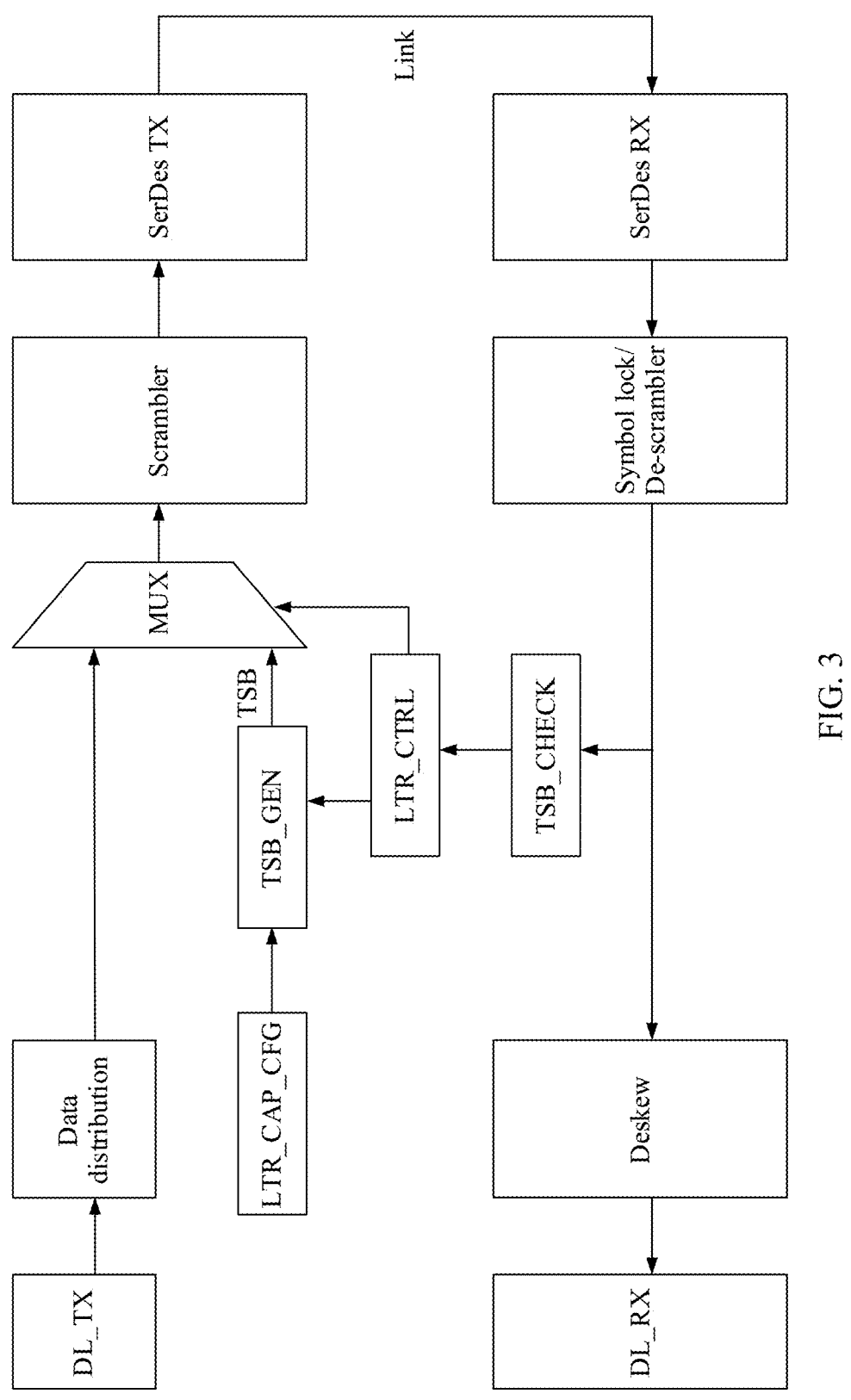
FIG. 3 is a diagram of a structure of an I/O host controller according to an embodiment of this application.
Figure 7A:
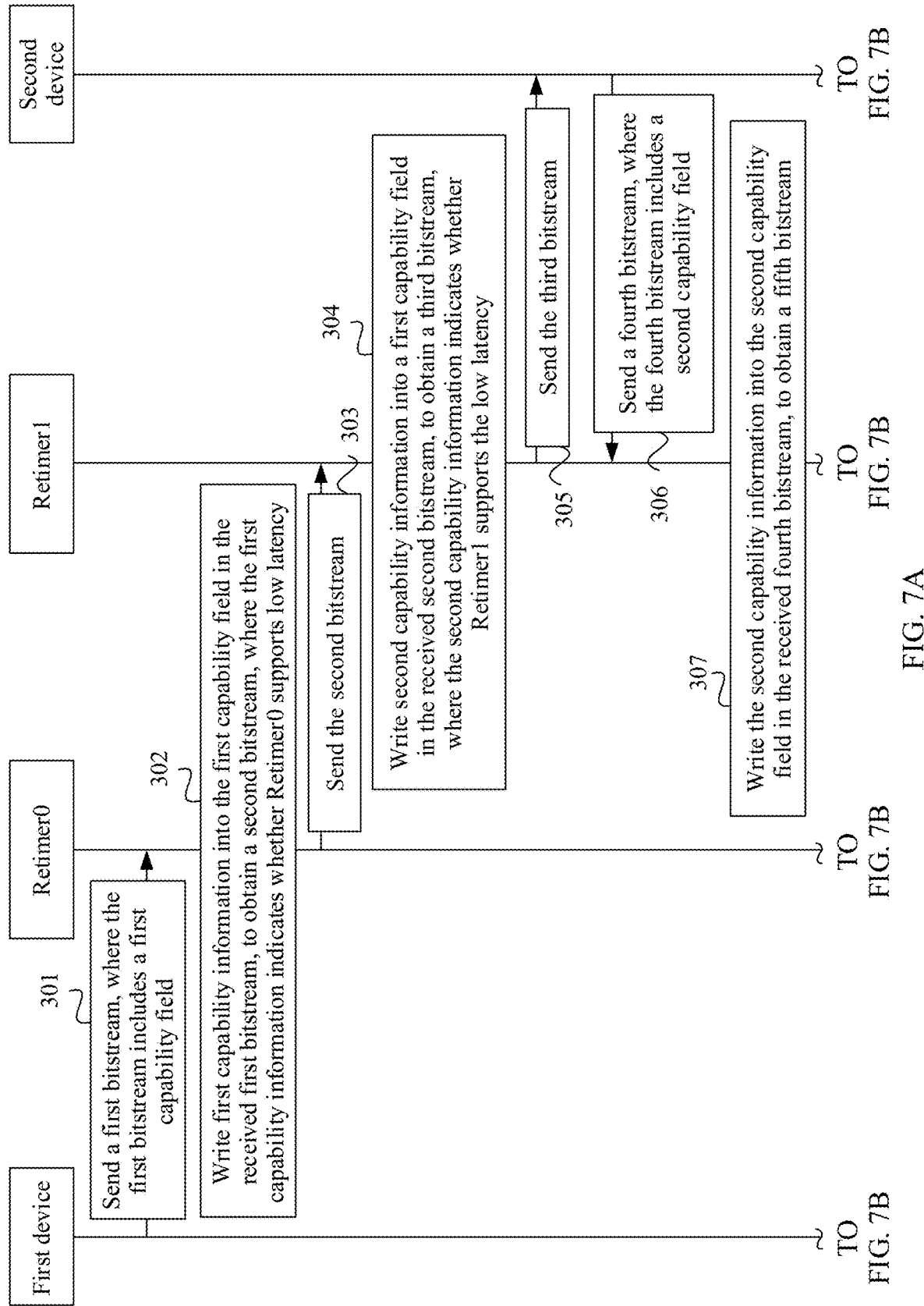
FIG. 7A to FIG. 7D are a schematic flowchart of another retimer path control method for wired serial data transmission according to an embodiment of this application.
Figure 7B:
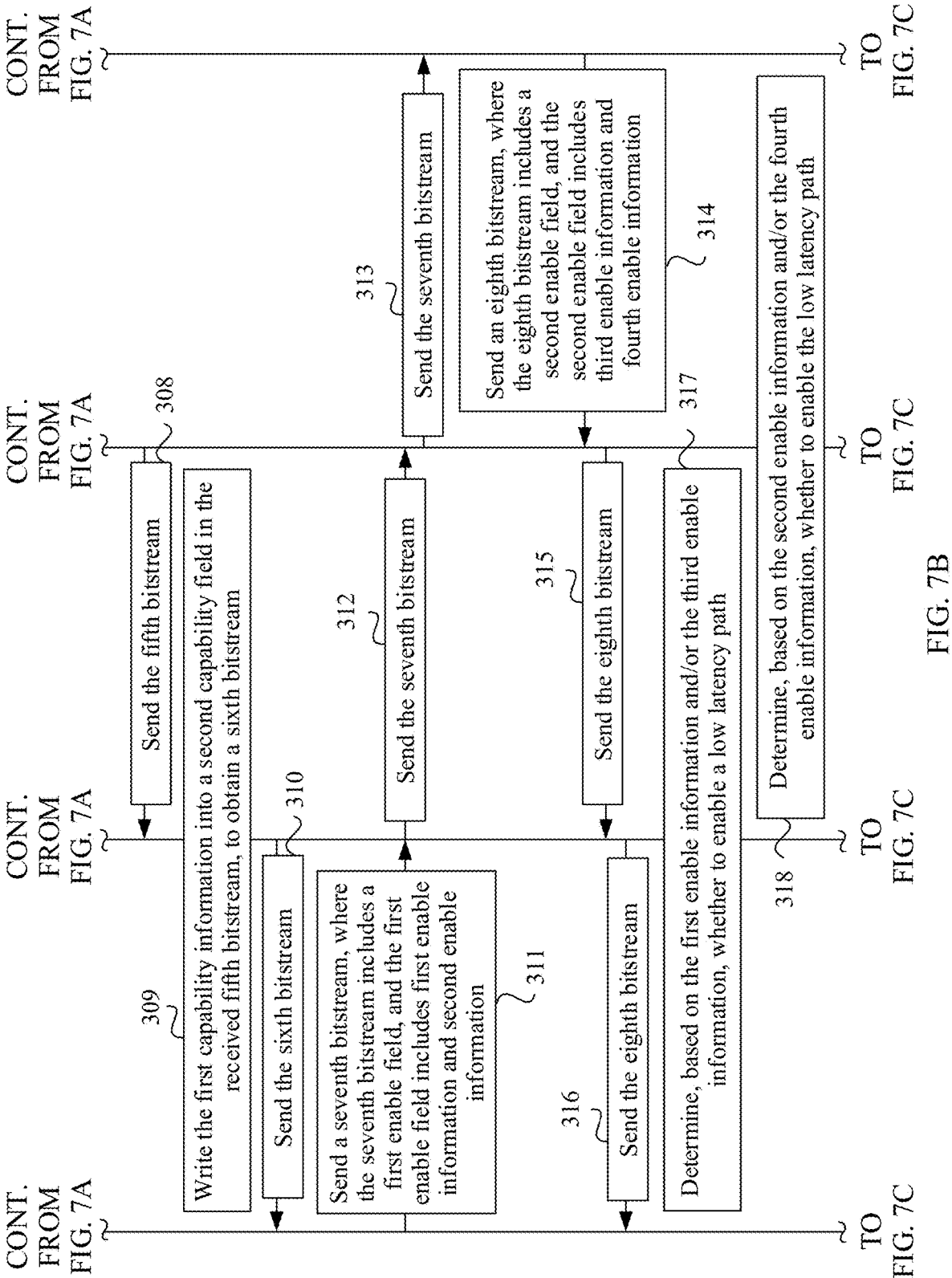
Figure 7C:
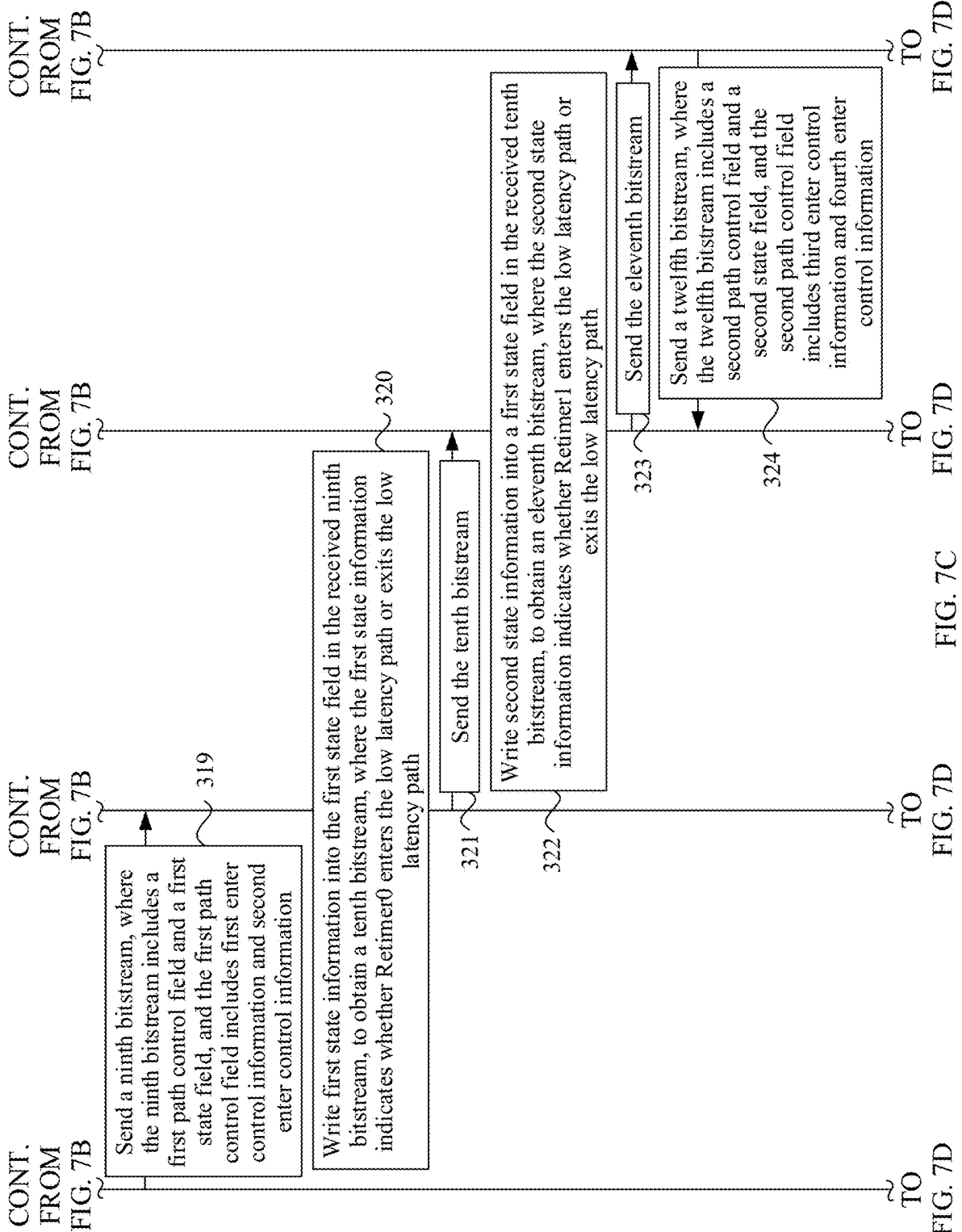
Figure 7D:
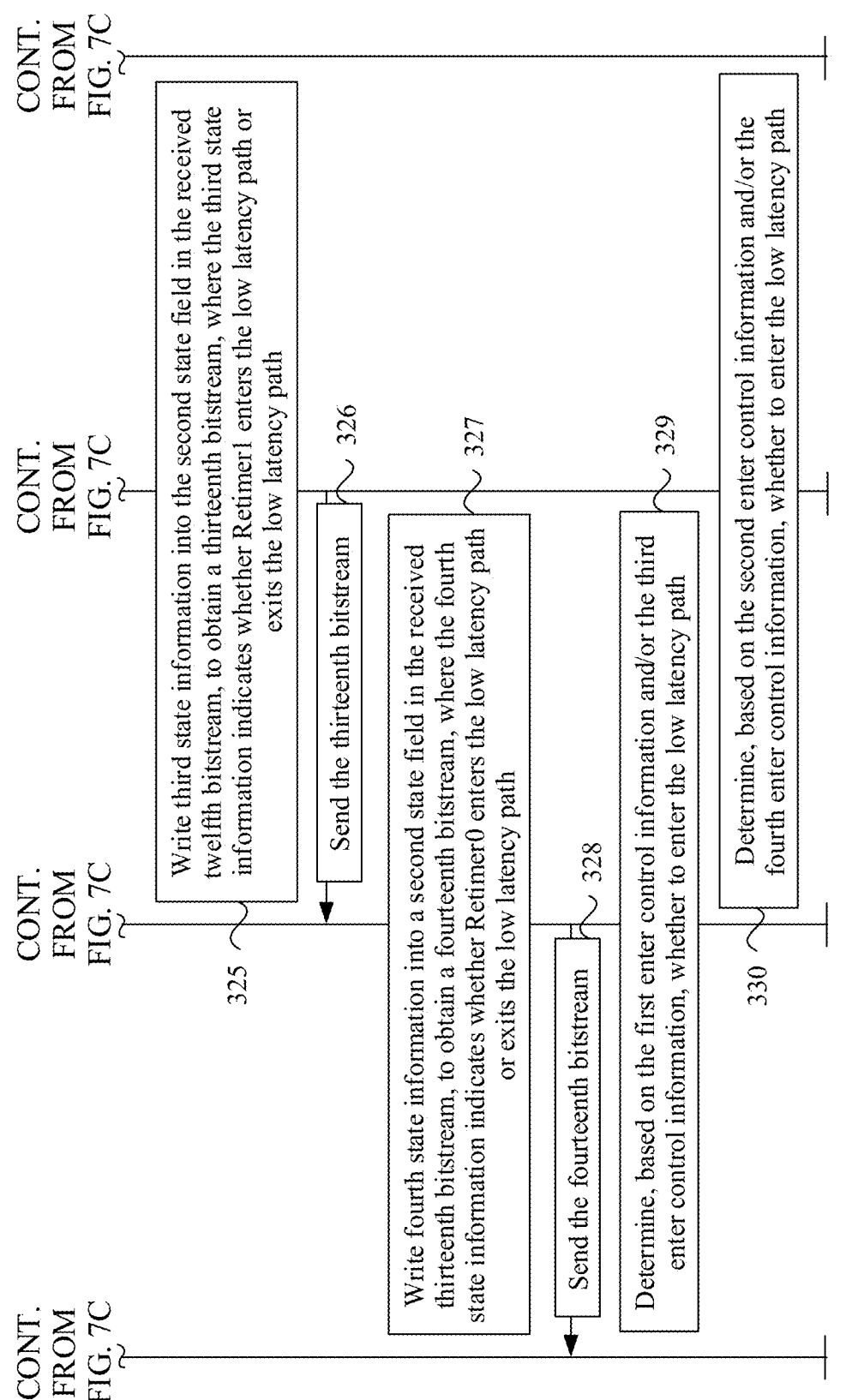

FIG. 3 is a diagram of a structure of an I/O host controller according to an embodiment of this application. FIG. 3 shows a partial structure of a data link layer (DL) and a structure of a physical layer of the I/O host controller. For a structure of a first I/O host controller or a structure of a second I/O host controller, refer to FIG. 3. The DL of the I/O host controller includes a DL transmitter (DL TX) and a DL receiver (DL_RX). The physical layer of the I/O host controller includes a data distribution component, a training set block generate (TSB_GEN) component, a low latency retimer capability configure (LTR_CAP_CFG) register component, a low latency retimer control (LTR_CTRL) component, a training set block check (TSB_CHECK) component, a multiplexer (MUX), a scrambler, a SerDes TX, a SerDes RX, a symbol lock/de-scrambler component, and a deskew component.

The following uses FIG. 3 as an example to describe an interaction process between the first I/O host controller and the second I/O host controller in the method provided in this embodiment of this application. It is assumed that the first I/O host controller and the second I/O host controller interact with each other based on a TSB in a link training phase. The TSB may be transmitted between a physical layer of the first I/O host controller and a physical layer of the second I/O host controller. After the link training phase ends, service data is transmitted between the first I/O host controller and the second I/O host controller.

For the first I/O host controller, a data distribution component is configured to: receive service data sent by a DL TX, perform forward error correction (FEC) on the received service data, and distribute the data to a MUX for distribution on physical lanes. An LTR_CTRL component is configured to control a state of the first I/O host controller. An LTR_CAP_CFG register component is configured to configure low latency control information of a retimer. A TSB_GEN component is configured to: determine a type of a to-be-generated TSB based on a state controlled by the LTR_CTRL component, generate a TSB of this type based on the low latency control information configured in the LTR_CAP_CFG register component, and then send the TSB to the MUX. The MUX is configured to: select a path of data from the input service data and the TSB and send the data to a scrambler under the control of the LTR_CTRL component. The scrambler is configured to: scramble the received data, and then send scrambled data to a SerDes TX. The SerDes TX is configured to: convert the received parallel data into serial data, and send the serial data over a link.

For the second I/O host controller, a SerDes RX is configured to: receive the serial data from the link, convert the serial data into parallel TSBs, and then send parallel data to a symbol lock/de-scrambler component. The symbol lock/de-scrambler component is configured to perform frame delimitation and de-scrambling on the received parallel data. When the parallel data received by the symbol lock/de-scrambler component is service data, the symbol lock/de-scrambler component sends processed parallel service data to a deskew component. The deskew component is configured to: eliminate skew between lanes for the received parallel service data, and then send the processed parallel service data to a DL_RX. When the parallel data received by the symbol lock/de-scrambler component is TSBs, the symbol lock/de-scrambler component sends the parallel TSBs to a TSB_CHECK component. The TSB_CHECK component is configured to: identify data sent by the symbol lock/de-scrambler component to obtain a TSB, parse the TSB to obtain low latency control information in the TSB, and then send the low latency control information obtained through parsing to an LTR_CTRL component. The LTR_CTRL component is configured to control a state of the second I/O host controller based on the received low latency control information, so that a TSB_GEN component determines a type of a to-be-generated TSB.

Then, the second I/O host controller may perform a process of sending a TSB or service data, and correspondingly, the first I/O host controller performs a process of receiving the TSB or the service data. For a process in which the second I/O host controller sends the TSB or the service data, refer to a process in which the first I/O host controller sends the TSB or the service data. For a process in which the first I/O host controller receives the TSB or the service data, refer to a process in which the second I/O host controller receives the TSB or the service data. Details are not described again in this embodiment of this application.

It should be noted that the SerDes TX in FIG. 3 may also receive a TSB or service data, and the SerDes RX may also send a TSB or service data. Sending and receiving of the SerDes TX and the SerDes RX are not limited in this embodiment of this application.

Optionally, in this embodiment of this application, a state controlled by the LTR_CTRL component in the I/O host controller may include at least one of the following: a discovery state, a configuration state, a retrain state, an equalization state, and a link active state. The discovery state, the configuration state, the retrain state, and the equalization state are states in a link establishment phase, and the link active state is a state in a service data sending phase after link establishment is completed. The discovery state may also be referred to as a low latency capability declaration interaction state. The configuration state may also be referred to as a low latency switch handshake acknowledgment state. The retrain state may also be referred to as a waiting low latency switch end state. The link active state may also be referred to as a service data transmission state.

FIG. 4 is a diagram of a structure of a physical layer of a retimer according to an embodiment of this application. For a physical layer structure of the first retimer 103 and a physical layer structure of the second retimer 104, refer to FIG. 4. The physical layer of the retimer includes a SerDes RX, a low latency switch control component, a TSB_CHECK/GEN component, a normal data path, a low latency path), a MUX, and a SerDes TX. The TSB_CHECK/GEN component is located on the normal data path.

The retimer has two data transmission directions. For example, data transmission directions of the first retimer 103 include a direction of transmission from the first device 101 to the second device 102 and a direction of transmission from the second device 102 to the first device 101. Correspondingly, the retimer includes two normal data paths respectively corresponding to the two data transmission directions and two low latency paths respectively corresponding to the two data transmission directions. The retimer is configured to forward data through a normal data path or a low latency path corresponding to a transmission direction of received data.

The following uses FIG. 4 as an example to describe a process in which the retimer receives data sent by a first I/O host controller and forwards the received data to a second I/O host controller in the method provided in this embodiment of this application. A TSB may be transmitted between physical layers of the first I/O host controller, the retimer, and the second I/O host controller.

When TSBs are forwarded by the retimer, the SerDes RX in the retimer is configured to convert received serial TSBs into parallel TSBs, and then send the parallel TSBs through a normal data path corresponding to a current data transmission direction. The parallel TSBs are sent to the MUX through the normal data path. The MUX is configured to send the parallel TSBs to the SerDes TX. The SerDes TX is configured to convert the received parallel TSBs into serial TSBs and sends the serial TSBs to the second I/O host controller. In addition, the TSB_CHECK component is configured to identify the TSBs, parse the TSBs to obtain control information in the TSBs, and determine a subsequent service data transmission path based on the control information. The TSB_GEN component is configured to generate a TSB. The generated TSB is sent to the first I/O host controller through the normal data path and the SerDes RX, and is sent to the second I/O host controller through the normal data path and the SerDes TX.

When service data is forwarded by the retimer, the SerDes RX in the retimer is configured to convert received serial service data into parallel service data, and then send the parallel service data through a normal data path or a low latency path corresponding to a current data transmission direction. The parallel service data is sequentially transmitted to the second I/O host controller through the MUX and the SerDes TX. For this process, refer to a TSB transmission process. Details are not described again in this embodiment of this application.

The Low_latency_switch_ctrl component is equivalent to a state machine, and is configured to control a state of the retimer in a transmission process of a TSB or service data. Optionally, the state controlled by the Low_latency_switch_ctrl component may include at least one of the following: a data forwarding state on a normal path, a low latency switch state, and a data forwarding state on a low latency path.

Optionally, in the retimer path control method for wired serial data transmission provided in this embodiment of this application, path control of the retimer may be implemented based on a bitstream. The bitstream may include a TSB. The following describes a structure of the TSB. FIG. 5 is a diagram of a structure of a TSB according to an embodiment of this application. The TSB includes a TSB type part, at least one TSB payload part (two parts are shown in FIG. 5), and a TSB cyclic redundancy check (CRC) part. Each TSB payload part corresponds to one retimer.

It can be learned from the foregoing description that an LTR_CTRL component is configured to control a state of an I/O host controller. In different states, types of TSBs generated by the I/O host controller are different. In different types of TSBs, meanings of TSB TYPE parts and TSB CRC parts are the same, and meanings of TSB payload parts are different. The TSB TYPE part is used to carry information indicating a current state of the I/O host controller, and different types of TSB TYPE parts carry different information. The TSB payload part is used to carry information related to path control of the retimer, and a length of the payload part may be any value. This is not limited in this embodiment of this application. The TSB CRC part is used to carry check information, and the check information is used to check correctness of the TSB, so as to prevent transmission of an incorrect TSB from affecting path control of the retimer.

An embodiment of this application provides a retimer path control method for wired serial data transmission. The method may be applied to the communication system shown in FIG. 1 or FIG. 2. In a first embodiment, the method is described by using an example in which the method is executed by a device (for example, a first device 101 or a second device 102). FIG. 6 is a schematic flowchart of a retimer path control method for wired serial data transmission according to an embodiment of this application. FIG. 6 describes a process of controlling whether a retimer enters a low latency path. The method may include the following procedures.

201: Receive a first bitstream, where the first bitstream includes a first field, and the first field includes capability information of the retimer.

The capability information indicates whether the retimer supports the low latency path.

202: Send a second bitstream to the retimer, where the second bitstream includes a second field, the second field includes first enter control information, and the first enter control information indicates whether the retimer enters the low latency path.

Data transmission paths in the retimer include a normal data path and a low latency path. Components included in the normal data path and the low latency path are different. The low latency path is a path with lowest latency in the data transmission paths of the retimer. When forwarding received data, Retimer0 may transmit the data through the normal data path or the low latency path.

For example, components included in the normal data path may include a serial to parallel (S2P) converter, an alignment, decoder and de-scrambler, an elastic buffer, a multi-protocol training control block, a staging buffer, a MUX, a converter, and the like. Components included in the low latency path may include a clock data recovery (CDR) component, a phase locked loop (PLL), and the like.

In the retimer path control method for wired serial data transmission provided in this embodiment of this application, the first bitstream including the first field is received, where the first field includes the capability information of the retimer. Then, the second bitstream including the second field is sent to the retimer based on the capability information, where the second field includes the first enter control information, and the first enter control information indicates whether the retimer enters the low latency path. A device may determine, based on the first bitstream, whether the retimer supports the low latency path, and then control a path of the retimer based on the second bitstream, so that the retimer can determine, based on the second bitstream, whether to enter the low latency path. In this case, the retimer may not independently enter the low latency path, thereby effectively controlling the path of the retimer, and the retimer may not send an indication bitstream to the communication device, thereby preventing the device from becoming abnormal caused by the indication bitstream.

In a second embodiment, this path control method is described by using a first device, a first retimer (hereinafter referred to as Retimer0), a second retimer (hereinafter referred to as Retimer1), and a second device as an example. A retimer path control process includes controlling whether a retimer enters a low latency path and controlling whether a retimer exits a low latency path. FIG. 7A to FIG. 7D are a schematic flowchart of another retimer path control method for wired serial data transmission according to an embodiment of this application. FIG. 7A to FIG. 7D describe a process of controlling whether a retimer enters a low latency path. In an example in which Retimer0 is controlled to enter a low latency path and Retimer1 is controlled not to enter a low latency path, the method may include the following procedures.

301: The first device sends a first bitstream to Retimer0, where the first bitstream includes a first capability field.

Figures 8, 9, 10:
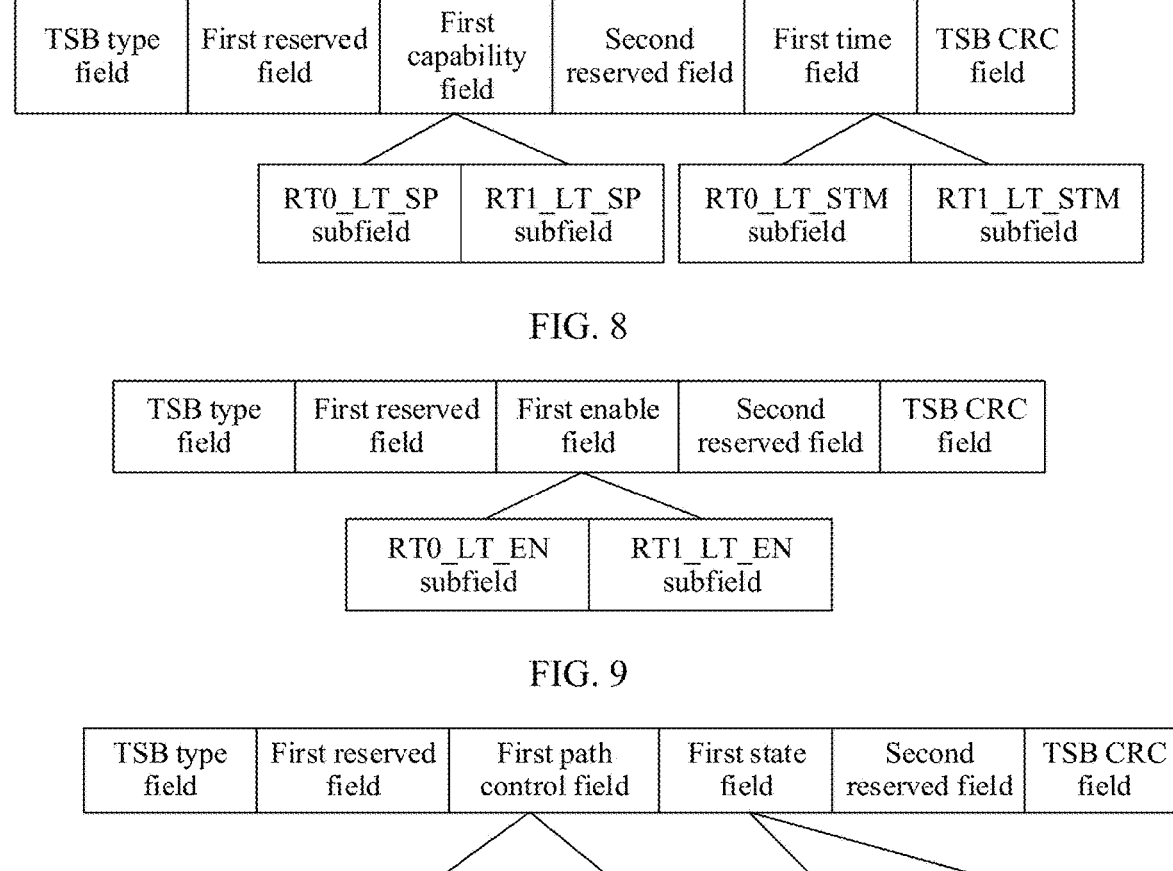
FIG. 8 is a diagram of a structure of a discovery training set block (DTSB) according to an embodiment of this application.
FIG. 9 is a diagram of a structure of a configuration training set block (CTSB) according to an embodiment of this application.
FIG. 10 is a diagram of a structure of a retrain training set block (RTSB) according to an embodiment of this application.

The first bitstream may include a DTSB. For example, FIG. 8 is a diagram of a structure of a DTSB according to an embodiment of this application. The DTSB includes a TSB type field, a first capability field, and a TSB CRC field. In FIG. 5, the first capability field belongs to the TSB payload part. The first capability field includes a low latency support subfield separately corresponding to at least one retimer located between the first device and the second device. In other words, a quantity of low latency support subfields included in the first capability field is at least equal to a quantity of retimers between the first device and the second device. In this embodiment of this application, Retimer0 and Retimer1 are included between the first device and the second device, and the first capability field may include at least a Retimer0 low latency support (RT0_LT_SP) subfield and a Retimer1 low latency support (RT1_LT_SP) subfield.

A length of the DTSB may be any value. This is not limited in this embodiment of this application. For example, when there are two retimers, the DTSB may be a bitstream with a length of four bytes, and the four bytes may be denoted as Symbol0, Symbol1, Symbol2, and Symbol3. The TSB type field occupies Symbol0, the first capability field occupies Symbol1, and the TSB CRC field occupies Symbol2 and Symbol3.

Refer to Table 1. For example, Table 1 shows meanings of bytes included in a DTSB. Table 1 is described by using an example in which the DTSB is a bitstream of four bytes from Symbol0 to Symbol3 and retimers include Retimer0 and Retimer1. As shown in Table 1, state information included in a TSB type field may be 0xA0, 0xB0, 0xC0, or 0xD0, where 0xA0 indicates a discovery state, 0xB0 indicates a configuration state, 0xC0 indicates a retrain state, and 0xD0 indicates an equalization state. In Symbol0, a bit other than a bit occupied by the TSB type field is a reserved bit. As shown in FIG. 8, the DTSB may further include a first reserved field, and the first reserved field occupies a reserved bit in Symbol0.

A first capability field occupies two bits (Bit0 and Bit1) in Symbol1. An RT0_LT_SP subfield occupies Bit0. When Bit0 is 0, it indicates that Retimer0 supports a low latency path. When Bit0 is 1, it indicates that Retimer0 does not support a low latency path. A RT1_LT_SP subfield occupies Bit1. When Bit1 is 0, it indicates that Retimer1 supports a low latency path. When Bit1 is 1, it indicates that Retimer1 does not support a low latency path. Bit0 and Bit1 are valid only when a current port is a retimer port, that is, valid only when a port that transmits the DTSB is a retimer port. Bit2 and Bit3 in Symbol1 are reserved bits. As shown in FIG. 8, the DTSB may further include a second reserved field, and the second reserved field occupies Bit2 and Bit3 in Symbol1.

The TSB CRC field occupies respective 8 bits of Symbol2 and Symbol3. The TSB CRC field includes check information, and the check information is used to check correctness of bits in Symbol0 and Symbol1.

TABLE 1

| Symbol number | Description |
|---|---|
| 0 | 0xA0: Discovery<br>0xB0: Configuration<br>0xC0: Retrain<br>0xD0: Equalization<br>Other: Reserved |
| 1 | Bit0: Retimer0 low latency support<br>(1'b0: Retimer0 support a low latency path<br>1'b1: Retimer0 not support a low latency path)<br>Bit1: Retimer1 low latency support<br>(1'b0: Retimer1 support a low latency path<br>1'b1: Retimer1 not support a low latency path)<br>Bit[3:2]Reserved<br>Bit[5:4]: Retimer0 low latency switch time<br>Bit[7:6]: Retimer1 low latency switch time |
| 2 | [7:0]for Symbol0-Symbol1 |
| 3 | [15:8]for Symbol0-Symbol1 |

It should be noted that the structure of the DTSB shown in FIG. 8 and the meanings of the bytes in the DTSB shown in Table 1 are examples for description, and are not limited thereto. For example, when a quantity of retimers between the first device and the second device is large, subfields included in the first capability field of the DTSB increases accordingly, and bytes in the DTSB are also required to increase accordingly.

302: Retimer0 writes first capability information into the first capability field in the received first bitstream, to obtain a second bitstream, where the first capability information indicates whether Retimer0 supports a low latency path.

For example, the DTSB bitstream in the procedure 301 is used as an example. Before Retimer0 writes the first capability information into the first capability field, the first capability field may include default first capability information. For example, the default first capability information in the RT0_LT-SP subfield may be 0.

When writing the first capability information into the first capability field, Retimer0 may first decode the received first bitstream, and then determine, based on whether Retimer0 supports the low latency, whether the first capability information is the same as the default first capability information. When the first capability information is the same as the default first capability information, content in the RT0_LT_SP subfield may not be modified. In this case, the obtained second bitstream is the same as the first bitstream. When the first capability information is different from the default first capability information, content in the RT0_LT_SP subfield is required to be modified to the first capability information. In this case, the second bitstream is different from the first bitstream. It is assumed that Retimer0 supports the low latency. The default first capability information in the RT0_LT_SP subfield is 0. Retimer0 may modify a value in the RT0_LT_SP subfield to 1.

Optionally, the first bitstream may further include a first time field, and Retimer0 may further write first duration information into the first time field to obtain the second bitstream. The first duration information indicates consumed duration for Retimer0 to enter or exit the low latency path.

Before Retimer0 writes the first duration information into the first time field, the first time field may include default first duration information. For example, the default first duration information in the RT0_LT_STM subfield may be 00. When writing the first duration information into the first time field, Retimer0 may first decode the received first bitstream, and then determine whether the first duration information is the same as the default first duration information. When the first duration information is the same as the default first duration information, content in the RT0_LT_STM subfield may not be modified. When the first duration information is different from the default first duration information, content in the RT0_LT_STM subfield is required to be modified to the first duration information. If the content in the RT0_LT_SP subfield and/or the content in the RT0_LT_STM subfield are/is modified, the obtained second bitstream is different from the first bitstream; or if neither the content in the RT0_LT_SP subfield nor the content in the RT0_LT_STM subfield is modified, the obtained second bitstream is the same as the first bitstream.

For example, as shown in FIG. 8, the DTSB further includes a first time field, and the first time field includes a low latency time subfield separately corresponding to at least one retimer. In other words, a quantity of low latency time subfields included in the first time field is at least equal to a quantity of retimers between the first device and the second device. In this embodiment of this application, the retimer includes Retimer0 and Retimer1, and the first time field may include at least a Retimer0 low latency switch time (RT0_LT_STM) subfield and a Retimer1 low latency switch time (RT1 LT_STM) subfield.

As shown in Table 1, the first time field occupies 4 bits (Bit4 to Bit7) in Symbol1. The RT0_LT_STM subfield occupies Bit4 and Bit5, and the RT1_LT_STM subfield occupies Bit6 and Bit7. A unit of duration information contained in the RT0_LT_STM subfield and RT1_LT_STM subfield may be millisecond (ms).

303: Retimer0 sends the second bitstream to Retimer1.

For example, a value of an RT0_LT_SP subfield in a first capability field of the second bitstream sent by Retimer0 to Retimer1 is 1.

304: Retimer1 writes second capability information into the first capability field in the received second bitstream, to obtain a third bitstream, where the second capability information indicates whether Retimer1 supports the low latency.

For example, the DTSB bitstream in the procedure 301 is used as an example. Before Retimer1 writes the second capability information into the first capability field, the first capability field may include default second capability information. For example, the default second capability information in an RT1_LT_SP subfield may be 0.

When writing the second capability information into the first capability field, Retimer1 may first decode the received second bitstream, and then determine, based on whether Retimer1 supports the low latency, whether the second capability information is the same as the default second capability information. When the second capability information is the same as the default second capability information, content in the RT1_LT_SP subfield may not be modified. In this case, the obtained third bitstream is the same as the second bitstream. When the second capability information is different from the default second capability information, content in the RT1_LT_SP subfield is required to be modified to the second capability information. In this case, the third bitstream is different from the second bitstream. For example, it is assumed that Retimer1 does not support the low latency. The default second capability information in the RT1_LT_SP subfield is 0. Retimer1 may not modify the value in the RT1_LT_SP subfield.

Optionally, the second bitstream may further include a first time field, and Retimer1 may further write second duration information into the first time field to obtain the third bitstream. The second duration information indicates consumed duration for Retimer1 to enter or exit the low latency path.

Before Retimer1 writes the second duration information into the first time field, the first time field may include default second duration information. For example, the default second duration information in an RT1_LT_STM subfield may be 00. When writing the second duration information into the first time field, Retimer1 may first decode the received first bitstream, and then determine whether the second duration information is the same as the default second duration information. When the second duration information is the same as the default second duration information, content in the RT1_LT_STM subfield may not be modified. When the second duration information is different from the default second duration information, content in the RT1_LT_STM subfield is required to be modified to the second duration information. If the content in the RT1_LT_SP subfield and/or the content in the RT1_LT_STM subfield are/is modified, the obtained third bitstream is different from the second bitstream; or if neither the content in the RT1_LT_SP subfield nor the content in the RT1_LT_STM subfield is modified, the obtained third bitstream is the same as the second bitstream.

For a structure of the DTSB in this process, refer to FIG. 8. Details are not described again in this embodiment of this application.

305: Retimer1 sends the third bitstream to the second device.

For example, a value of an RT0_LT_SP subfield in a first capability field of the third bitstream sent by Retimer1 to the second device is 1, and a value of an RT1_LT_SP subfield is 0.

306: The second device sends a fourth bitstream to Retimer1, where the fourth bitstream includes a second capability field.

A structure of the fourth bitstream is the same as that of the first bitstream. For the structure and related descriptions of the fourth bitstream, refer to those of the first bitstream shown in FIG. 8 and the content in Table 1. Details are not described again in this embodiment of this application.

307: Retimer1 writes the second capability information into the second capability field in the received fourth bitstream, to obtain a fifth bitstream.

For this procedure, refer to the procedure 304. Details are not described again in this embodiment of this application.

308: Retimer1 sends the fifth bitstream to Retimer0.

In this procedure, a value of an RT1_LT_SP subfield in a second capability field of the fifth bitstream sent by Retimer1 to Retimer0 is 0.

309: Retimer0 writes the first capability information into the second capability field in the received fifth bitstream, to obtain a sixth bitstream.

For this procedure, refer to the procedure 302. Details are not described again in this embodiment of this application.

310: Retimer0 sends the sixth bitstream to the first device.

In this procedure, a value of an RT1_LT_SP subfield in a second capability field of the sixth bitstream sent by Retimer0 to the first device is 0, and a value of an RT0_LT_SP subfield is 1.

It should be noted that the procedures 301 to 310 may be repeatedly performed for a plurality of times, that is, the first device may send a plurality of first bitstreams to Retimer0, and the second device may send a plurality of fourth bitstreams to Retimer1.

311: The first device sends a seventh bitstream to Retimer0, where the seventh bitstream includes a first enable field, and the first enable field includes first enable information and second enable information.

The first enable information indicates whether to enable the low latency path of Retimer0, and the second enable information indicates whether to enable the low latency path of Retimer1.

The third bitstream may include a configuration training set block (CTSB). For example, FIG. 9 is a diagram of a structure of a CTSB according to an embodiment of this application. The CTSB includes a TSB type field, a first enable field, and a TSB CRC field. In FIG. 5, the first enable field belongs to the TSB payload part. The first enable field includes a low latency enable subfield separately corresponding to at least one retimer located between the first device and the second device. In other words, a quantity of low latency enable subfields included in the first enable field is at least equal to a quantity of retimers between the first device and the second device. In this embodiment of this application, Retimer0 and Retimer1 are included between the first device and the second device, and the first enable field may include at least a Retimer0 low latency enable (RT0 LT EN) subfield and a Retimer1 low latency enable (RT1_LT_EN) subfield. The RT0_LT_EN subfield includes first enable information, and the RT1_LT_EN subfield includes second enable information.

A length of the CTSB may be any value. This is not limited in this embodiment of this application. For example, when there are two retimers, for bytes of the CTSB, refer to the DTSB. The TSB type field occupies Symbol0, the first enable field occupies Symbol1, and the TSB CRC field occupies Symbol2 and Symbol3.

Refer to Table 2. For example, Table 2 shows meanings of bytes included in a CTSB. Table 2 is described by using an example in which the CTSB is a bitstream of four bytes from Symbol0 to Symbol3 and retimers include Retimer0 and Retimer1. Meanings of Symbol0, Symbol2, and Symbol3 in Table 2 are the same as those in Table 1. Therefore, the CTSB may further include a first reserved field. Meanings of Symbol0, Symbol2, and Symbol3 are not described again in this embodiment of this application.

A first enable field occupies two bits (Bit0 and Bit1) in Symbol1. An RT0_LT_EN subfield occupies Bit0. When Bit0 is 0, it indicates that a low latency path of Retimer0 is disabled, that is, the low latency path of Retimer0 is not enabled. When Bit0 is 1, it indicates that the low latency path of Retimer0 is enabled. A RT1_LT_EN subfield occupies Bit. When Bit(is 0, it indicates that a low latency path of Retimer1 is disabled, that is, the low latency path of Retimer is not enabled. When Bit1 is 1, it indicates that the low latency path of Retimer1 is enabled. Bit2 to Bit7 in Symbol1 are reserved bits. As shown in FIG. 9, the CTSB may further include a second reserved field, and the second reserved field occupies Bit2 to Bit7 in Symbol1.

TABLE 2

| Symbol number | Description |
| --- | --- |
| 0 | 0xA0: Discovery |
| | 0xB0: Configuration |
| | 0xC0: Retrain |
| | 0xD0: Equalization |
| | Other: Reserved |
| 1 | Bit0: Retimer0 low latency Enable |
| | (1'b0: Disable Retimer0 low latency path |
| | 1'b1: Enable Retimer0 low latency path) |
| | Bit1: Retimer1 low latency Enable |
| | (1'b0: Disable Retimer1 low latency path |
| | 1'b1: Enable Retimer1 low latency path) |
| | Bit[7:2] Reserved |

TABLE 2-continued

| Symbol number | Description |
|---|---|
| 2 | [7:0]for Symbol0-Symbol1 |
| 3 | [15:8]for Symbol0-Symbol1 |

It should be noted that the structure of the CTSB shown in FIG. 9 and the meanings of the bytes in the CTSB shown in Table 2 are examples for description, and are not limited thereto. For example, when a quantity of retimers between the first device and the second device is large, subfields included in the first enable field of the CTSB increases accordingly, and bytes in the CTSB are also required to increase accordingly.

312: Retimer0 sends the seventh bitstream to Retimer1.

313: Retimer1 sends the seventh bitstream to the second device.

314: The second device sends an eighth bitstream to Retimer1, where the eighth bitstream includes a second enable field, and the second enable field includes third enable information and fourth enable information.

The third enable information indicates whether to enable the low latency path of Retimer0, and the fourth enable information indicates whether to enable the low latency path of Retimer1.

A structure of the eighth bitstream is the same as that of the seventh bitstream. For the structure and related descriptions of the eighth bitstream, refer to those of the seventh bitstream shown in FIG. 9 and the content in Table 2. Details are not described again in this embodiment of this application.

315: Retimer1 sends the eighth bitstream to Retimer0.

316: Retimer0 sends the eighth bitstream to the first device.

317: Retimer0 determines, based on the first enable information and/or the third enable information, whether to enable the low latency path.

The first enable information and the third enable information may be the same or different.

The procedures 311 to 313 are a process in which the first device sends the seventh bitstream to the second device, and the procedures 314 to 316 are a process in which the second device sends the eighth bitstream to the first device. There is no sequence between the processes of sending the seventh bitstream and the eighth bitstream, and the two sending processes may be performed at the same time.

It can be learned from the foregoing descriptions that a normal data transmission path and a low latency path of a retimer each include two paths respectively corresponding to two transmission directions.

In an implementation, Retimer0 may determine, based on any one of the first enable information and the third enable information, whether to enable both the two low latency paths. For example, Retimer0 may determine, based on enable information included in an earlier received bitstream in the seventh bitstream and the eighth bitstream, whether to enable both the two low latency paths. For example, Retimer0 first receives the eighth bitstream, and may determine, based on the third enable information included in the eighth bitstream, whether to enable both the two low latency paths. It is assumed that the third enable information indicates to enable the low latency paths of Retimer0 (that is, the value of the RT0_LT_EN subfield is 1), and both the two low latency paths are enabled.

In this implementation, the procedure 317 may be performed after Retimer0 first receives the bitstreams. There is no sequence between the processes of forwarding the received bitstreams and the procedure 317, and the processes and the procedure may be performed at the same time. For example, Retimer0 first receives the eighth bitstream, after receiving the eighth bitstream, the procedure 317 may be performed, and the procedure 316 is performed at the same time.

In another implementation, Retimer0 may determine, based on the first enable information and the third enable information, whether to enable the low latency paths. For example, Retimer0 may determine, based on the first enable information and the third enable information, whether to enable both the two low latency paths. Optionally, Retimer0 may perform an AND logical operation or an OR logical operation on the first enable information and the third enable information, and determine, based on a result of the AND logical operation or the OR logical operation, whether to enable both the two low latency paths.

For example, it is assumed that the first enable information indicates to enable the low latency paths of Retimer0 (that is, the value of the RT0_LT_EN subfield is 1). The third enable information indicates not to enable the low latency paths of Retimer0 (that is, the value of the RT1_LT_EN subfield is 0). Retimer0 performs the AND operation on the first enable information and the third enable information, and determines not to enable the two low latency paths. Alternatively, Retimer0 performs the OR operation on the first enable information and the third enable information, and determines to enable the two low latency paths.

For another example, Retimer0 may separately and independently determine, based on the first enable information and the third enable information, whether to enable the two low latency paths. In other words, Retimer0 may determine, based on the first enable information, whether to enable one low latency path, and determine, based on the third enable information, whether to enable the other low latency path. Optionally, the first enable field may further include first direction information. The second enable field may further include second direction information. The first direction information is different from the second direction information. The first direction information indicates a transmission direction corresponding to a low latency path enabled based on the first enable information. The second direction information indicates a transmission direction corresponding to a low latency path enabled based on the third enable information. Retimer0 may determine, based on the first enable information, whether to enable a low latency path corresponding to a transmission direction indicated by the first direction information, and determine, based on the third enable information, whether to enable a low latency path corresponding to a transmission direction indicated by the second direction information. For example, it is assumed that the first enable information indicates to enable the low latency paths of Retimer0 (that is, the value of the RT0_LT_EN subfield is 1). The first direction information indicates a transmission direction from the second device to the first device. Retimer0 may determine to enable a low latency path corresponding to the transmission direction from the second device to the first device. The third enable information indicates not to enable the low latency paths of Retimer0 (that is, the value of the RT1_LT_EN subfield is 0). The second direction information indicates a transmission direction from the first device to the second device. Retimer0 may determine not to enable a low latency path corresponding to the transmission direction from the first device to the second device.

Still optionally, Retimer0 may directly determine, based on the first enable information, whether to enable a low latency path corresponding to a transmission direction of the seventh bitstream, and determine, based on the third enable information, whether to enable a low latency path corresponding to a transmission direction of the eighth bitstream. For example, it is assumed that the first enable information indicates to enable the low latency paths of Retimer0 (that is, the value of the RT0_LT_EN subfield is 1). Retimer0 may determine to enable the low latency path corresponding to the transmission direction from the first device to the second device. The third enable information indicates not to enable the low latency paths of Retimer0 (that is, the value of the RT1_LT_EN subfield is 0). Retimer0 may determine not to enable the low latency path corresponding to the transmission direction from the first device to the second device.

In this implementation, the procedure 317 may be performed after Retimer0 receives the two bitstreams. There is no sequence between the processes of forwarding the received bitstreams and the procedure 317, and the processes and the procedure may be performed at the same time. For example, the procedure 317 may be performed after Retimer0 receives the seventh bitstream and the eighth bitstream, and the procedures 312 and 316 may be performed at the same time.

318: Retimer1 determines, based on the second enable information and/or the fourth enable information, whether to enable the low latency path.

For this procedure, refer to the procedure 317. Details are not described again in this embodiment of this application.

It should be noted that the procedures 311 to 318 may be repeatedly performed for a plurality of times, that is, the first device may send a plurality of seventh bitstreams to Retimer0, and the second device may send a plurality of eighth bitstreams to Retimer1.

For each seventh bitstream sent by the first device and each eighth bitstream sent by the second device, the first device is required to determine the first enable information and the second enable information, and the second device is required to determine the third enable information and the fourth enable information.

In an implementation, the first device may determine the first enable information based on the first capability information in the received sixth bitstream, and determine the second enable information based on the second capability information in the sixth bitstream. The second device determines the third enable information based on the first capability information in the received first bitstream, and determines the fourth enable information based on the second capability information. For example, if the first device determines, based on the first capability information, that Retimer0 supports the low latency, the first enable information indicating to enable the low latency path of Retimer0 may be determined. If the first device determines, based on the second capability information, that Retimer1 does not support the low latency, the second enable information indicating not to enable the low latency path of Retimer1 may be determined.

In this implementation, optionally, the first device may obtain first enable configuration information of Retimer0 and first enable configuration information of Retimer1. The first enable configuration information of Retimer0 indicates whether to enable a low latency capability of Retimer0. The first enable configuration information of Retimer1 indicates whether to enable a low latency capability of Retimer1. Then, the first device determines the first enable information based on the first capability information and the first enable configuration information of Retimer0, and determines the second enable information based on the second capability information and the first enable configuration information of Retimer1. The first enable configuration information of Retimer0 or the first enable configuration information of Retimer1 may be preconfigured in the first device, for example, as shown in FIG. 3, may be preconfigured in an LTR_CAP_CFG component. The first device may perform an AND logical operation or an OR logical operation on the first capability information and the first enable configuration information of Retimer0, to obtain the first enable information. Alternatively, an AND logical operation or an OR logical operation is performed on the second capability information and the first enable configuration information of Retimer1, to obtain the second enable information.

For example, if the first device determines, based on the first capability information, that Retimer0 supports the low latency, and determines, based on the first enable configuration information of Retimer0, that the low latency capability of Retimer0 is not enabled, the first device may determine, based on the AND logical operation, the first enable information indicating not to enable the low latency path of Retimer0, or determine, based on the OR logical operation, the first enable information indicating to enable the low latency path of Retimer0.

Similarly, the second device may also obtain second enable configuration information of Retimer0 and second enable configuration information of Retimer1. The second enable configuration information of Retimer0 indicates whether to enable the low latency capability of Retimer0. The second enable configuration information of Retimer1 indicates whether to enable the low latency capability of Retimer1. For a process in which the second device determines the third enable information and the fourth enable information, refer to the foregoing process in which the first device determines the first enable information and the second enable information. Details are not described again in this embodiment of this application.

Optionally, the first enable configuration information of Retimer0 may be different from the second enable configuration information of Retimer0, and correspondingly, the first enable information and the third enable information may also be different. The first enable configuration information of Retimer1 may be different from the second enable configuration information of Retimer1, and correspondingly, the second enable information and the fourth enable information may also be different.

In this case, further, one of the first device and the second device may be considered as a master device, and the other device may be considered as a slave device. For example, it is assumed that the first device is considered as the master device, and the second device is considered as the slave device. The third enable information in the eighth bitstream sent by the second device before receiving the seventh bitstream is determined based on the first capability information and the second enable configuration information of Retimer0. The fourth enable information is determined based on the second capability information and the second enable configuration information of Retimer1. After receiving the seventh bitstream, the second device may update the third enable information based on the first enable information included in the seventh bitstream, to obtain updated third enable information, where the updated third enable information is the same as the first enable information, and/or update the fourth enable information based on the second enable information included in the seventh bitstream, to obtain updated fourth enable information, where the updated fourth enable information is the same as the third enable information, so as to obtain updated eighth bitstream. Subsequently, the second device sends only the updated eighth bitstream to Retimer1. The updated eighth bitstream includes an updated second enable field, and the updated second enable field includes the updated third enable information and the updated fourth enable information.

The updated first enable information is the same as the second enable information, that is, enable information carried in the seventh bitstream and the eighth bitstream sent by the devices at the two ends is consistent. In this way, a retimer can determine, based on any enable information, whether to enable a low latency path, and may not start to determine whether to enable the low latency path only after receiving the first enable information and the second enable information, thereby improving efficiency of the retimer to determine whether to enable the low latency path, and improving path control efficiency.

In another implementation, one of the first device and the second device may be considered as a master device, and the other device may be considered as a slave device. For example, it is assumed that the first device is considered as a master device, and the second device is considered as a slave device. The first device may independently determine the first enable information and the second enable information. For this process, refer to the foregoing implementation. Details are not described again in this embodiment of this application. The third enable information and the fourth enable information in the eighth bitstream sent by the second device before receiving the seventh bitstream may be default. After receiving the seventh bitstream, the second device may update the third enable information based on the first enable information included in the seventh bitstream, to obtain updated third enable information, where the updated third enable information is the same as the first enable information, and/or update the fourth enable information based on the second enable information included in the seventh bitstream, to obtain updated fourth enable information, where the updated fourth enable information is the same as the third enable information, so as to obtain updated eighth bitstream. Subsequently, the second device sends only the updated eighth bitstream to Retimer1. The updated eighth bitstream includes an updated second enable field, and the updated second enable field includes the updated third enable information and the updated fourth enable information.

319: The first device sends a ninth bitstream to Retimer0, where the ninth bitstream includes a first path control field and a first state field, and the first path control field includes first enter control information and second enter control information.

The first enter control information indicates whether Retimer0 enters the low latency path, and the second enter control information indicates whether Retimer1 enters the low latency path.

In the procedure 311, the first device sends the seventh bitstream carrying the first enable information to Retimer0, and in the procedure 314, the second device sends the eighth bitstream carrying the third enable information to Retimer0. Both the first enable information and the third enable information indicate whether to enable the low latency path of Retimer0. The following describes concepts of enabling a low latency path by a retimer and entering the low latency path of the retimer. Enabling the low latency path by the retimer indicates preparations before the retimer enters the low latency path, for example, calibration and clock phase alignment. As shown in FIG. 4, that the retimer enters the low latency path indicates that the retimer switches an input end of the MUX from the normal data path to the low latency path.

The first device may determine the first enter control information based on the first enable information, and determine the second enter control information based on the second enable information. For example, if the first enable information indicates to enable the low latency path of Retimer0, the first enter control information indicating Retimer0 to enter the low latency path may be determined. If the first enable information indicates not to enable the low latency path of Retimer0, the first enter control information indicating Retimer0 not to enter the low latency path may be determined.

It should be noted that, if the first device updates the first enable information and the second enable information, the first enter control information is determined based on the updated first enable information, and the second enter control information is determined based on the updated second enable information.

The ninth bitstream may include an RTSB. For example, FIG. 10 is a diagram of a structure of an RTSB according to an embodiment of this application. The RTSB includes a TSB type field, a first path control field, a first state field, and a TSB CRC field. In FIG. 5, the first path control field and the first state field belong to the TSB payload part.

The first path control field includes an enter low latency subfield separately corresponding to at least one retimer located between the first device and the second device. In other words, a quantity of enter low latency subfields included in the first path control field is at least equal to a quantity of retimers between the first device and the second device. In this embodiment of this application, Retimer0 and Retimer1 are included between the first device and the second device. As shown in FIG. 10, the first path control field may include at least a Retimer0 enter low latency (RT0_ENTER LT) subfield and a Retimer1 enter low latency (RT1_ENTER LT) subfield. The RT0_ENTER_LT subfield includes first enter control information, and the RT1_ENTER_LT subfield includes second enter control information.

The first path control field may further include first exit control information and second exit control information. The first exit control information indicates whether Retimer0 exits the low latency path, and the second exit control information indicates whether Retimer1 exits the low latency path. As shown in FIG. 10, the first path control field further includes an exit low latency subfield separately corresponding to at least one retimer located between the first device and the second device. In other words, a quantity of exit low latency subfields included in the first path control field is at least equal to a quantity of retimers between the first device and the second device. In this embodiment of this application, Retimer0 and Retimer1 are included between the first device and the second device. The first path control field may include at least a Retimer0 exit low latency (RT0_EXIT_LT) subfield and a Retimer1 exit low latency (RT1_EXIT_LT) subfield. The RT0_EXIT_LT subfield includes first exit control information, and the RT1_EXIT_LT subfield includes second exit control information.

The first state field includes a low latency switch state subfield separately corresponding to at least one retimer located between the first device and the second device. In other words, a quantity of low latency switch state subfields included in the first state field is at least equal to a quantity of retimers between the first device and the second device.

In this embodiment of this application, Retimer0 and Retimer1 are included between the first device and the second device. As shown in FIG. 10, the first state field may include at least a Retimer0 low latency switch status (RT0_LT_SW) subfield and a Retimer1 low latency switch status (RT1_LT_SW) subfield.

A length of the RTSB may be any value. This is not limited in this embodiment of this application. For example, when there are two retimers, for bytes of the RTSB, refer to the DTSB. The TSB type field occupies Symbol0, the first path control field and the first state field occupy Symbol1, and the TSB CRC field occupies Symbol2 and Symbol3.

Refer to Table 3. Table 3 shows meanings of bytes included in an RTSB. Table 3 is described by using an example in which the RTSB is a bitstream of four bytes from Symbol0 to Symbol3 and retimers include Retimer0 and Retimer1. Meanings of Symbol0, Symbol2, and Symbol3 in Table 3 are the same as those in Table 1. Therefore, the RTSB may further include a first reserved field. Meanings of Symbol0, Symbol2, and Symbol3 are not described again in this embodiment of this application.

A first path control field occupies four bits (Bit0 to Bit3) in Symbol1. The RT0_ENTER_LT subfield occupies Bit0. When Bit0 is 0, it indicates that Retimer0 does not directly enter the low latency, that is, does not enter the low latency path. When Bit0 is 1, it indicates that Retimer0 directly enters the low latency, that is, enters the low latency path. The RT1_ENTER_LT subfield occupies Bit1. When Bit1 is 0, it indicates that Retimer1 does not directly enter the low latency, that is, does not enter the low latency path. When Bit1 is 1, it indicates that Retimer1 directly enters the low latency, that is, enters the low latency path.

The RT0_EXIT_LT subfield occupies Bit2. When Bit2 is 0, it indicates that Retimer0 does not directly exit the low latency, that is, does not exit the low latency path. When Bit2 is 1, it indicates that Retimer0 directly exits the low latency, that is, exits the low latency path. The RT1_EXIT_LT subfield occupies Bit3. When Bit3 is 0, it indicates that Retimer1 does not directly exit the low latency, that is, does not exit the low latency path. When Bit3 is 1, it indicates that Retimer1 directly exits the low latency, that is, exits the low latency path.

A first state field occupies two bits (Bit4 and Bit5) in Symbol1. The RT0_LT_SW subfield occupies Bit4, and the RT1_LT_SW subfield occupies Bit5. When Bit4 is 0, it indicates that Retimer0 is not in a low latency switch state, that is, it indicates that Retimer0 is not entering the low latency or is not exiting the low latency. When Bit4 is 1, it indicates that Retimer0 is in the low latency switch state, that is, it indicates that Retimer0 is entering the low latency or is exiting the low latency. When Bit5 is 0, it indicates that Retimer1 is not in a low latency switch state. When Bit5 is 1, it indicates that Retimer1 is in the low latency switch state.

Bit6 and Bit7 in Symbol1 are reserved bits. As shown in FIG. 10, the RTSB may further include a second reserved field, and the second reserved field occupies Bit6 and Bit7 in Symbol1.

TABLE 3

| Symbol number | Description |
| --- | --- |
| 0 | 0xA0: Discovery<br>0xB0: Configuration<br>0xC0: Retrain<br>0xD0: Equalization<br>Other: Reserved |

TABLE 3-continued

| Symbol number | Description |
| --- | --- |
| 1 | Bit0: Retimer0 Enter low latency<br>(1'b0: Not Direct Retimer0 Enter low latency<br>1'b1: Direct Retimer0 Enter low latency)<br>Bit1: Retimer1 Enter low latency<br>(1'b0: Not Direct Retimer1 Enter low latency<br>1'b1: Direct Retimer1 Enter low latency)<br>Bit2: Retimer0 Exit low latency<br>(1'b0: Not Direct Retimer0 Exit low latency<br>1'b1: Direct Retimer0 Exit low latency)<br>Bit3: Retimer1 Exit low latency<br>(1'b0: Not Direct Retimer1 Exit low latency<br>1'b1: Direct Retimer1 Exit low latency)<br>Bit4: Retimer0 low latency switch status<br>(1'b0: Retimer0 is not under low latency switch status<br>1'b1: Retimer0 is under low latency switch status)<br>Bit5: Retimer1 low latency switch status<br>(1'b0: Retimer1 is not under low latency switch<br>1'b1: Retimer1 is under low latency switch)<br>Bit[7:6]: Reserved |
| 2 | [7:0]for Symbol0-Symbol1 |
| 3 | [15:8]for Symbol0-Symbol1 |

It should be noted that the structure of the RTSB shown in FIG. 10 and the meanings of the bytes in the RTSB shown in Table 3 are examples for description, and are not limited thereto. For example, when a quantity of retimers between the first device and the second device is large, subfields included in the first path control field and the first state field of the RTSB increases accordingly, and bytes in the RTSB are also required to increase accordingly.

320: Retimer0 writes first state information into the first state field in the received ninth bitstream, to obtain a tenth bitstream, where the first state information indicates whether Retimer0 enters the low latency path or exits the low latency path.

For example, the RTSB bitstream in the procedure 319 is used as an example. Before Retimer0 writes the first state information into the first state field, the first state field may include default first state information. For example, the default first state information in the RT0_LT_SW subfield may be 0.

When writing the first state information into the first state field, Retimer0 may first decode the received ninth bitstream, and then determine, based on a current state of Retimer0, whether the first state information is the same as the default first state information. When the first state information is the same as the default first state information, content in the RT0_LT_SW subfield may not be modified. In this case, the obtained tenth bitstream is the same as the ninth bitstream. When the first state information is different from the default first state information, content in the RT0_LT_SW subfield is required to be modified to the first state information. In this case, the tenth bitstream is different from the ninth bitstream. It is assumed that the current state of Retimer0 is a state of entering the low latency path. The default first capability information in the RT0_LT_SW subfield is 0. Retimer0 may modify a value in the RT0_LT_SW subfield to 1.

321: Retimer0 sends the tenth bitstream to Retimer1.

For example, a value of an RT0_LT_SW subfield in a first state field of the tenth bitstream sent by Retimer0 to Retimer1 is 1.

322: Retimer1 writes second state information into the first state field in the received tenth bitstream, to obtain an eleventh bitstream, where the second state information indicates whether Retimer1 enters the low latency path or exits the low latency path.

For example, the RTSB bitstream in the procedure 319 is used as an example. Before Retimer1 writes the second state information into the first state field, the first state field may include default second state information. For example, the default second state information in the RT1_LT_SW subfield may be 0.

When writing the second state information into the first state field, Retimer1 may first decode the received tenth bitstream, and then determine, based on a current state of Retimer1, whether the second state information is the same as the default second state information. When the second state information is the same as the default second state information, content in the RT1_LT_SW subfield may not be modified. In this case, the obtained eleventh bitstream is the same as the tenth bitstream. When the second state information is different from the default second state information, content in the RT1_LT_SW subfield is required to be modified to the second state information. In this case, the eleventh bitstream is different from the tenth bitstream. It is assumed that the current state of Retimer1 is a state of not entering the low latency path. The default first capability information in the RT1_LT_SW subfield is 0. Retimer0 may not modify a value in the RT0_LT_SW subfield.

323: Retimer1 sends the eleventh bitstream to the second device.

For example, a value of an RT0_LT_SW subfield in a first state field of the eleventh bitstream sent by Retimer1 to the second device is 1, and a value of an RT1_LT_SW subfield is 0.

324: The second device sends a twelfth bitstream to Retimer1, where the twelfth bitstream includes a second path control field and a second state field, and the second path control field includes third enter control information and fourth enter control information.

The third enter control information indicates whether Retimer0 enters the low latency path, and the fourth enter control information indicates whether Retimer1 enters the low latency path. For a process in which the second device determines the third enter control information and the fourth enter control information, refer to the procedure 319. Details are not described again in this embodiment of this application.

The second path control field may further include third exit control information and fourth exit control information. The third exit control information indicates whether Retimer0 exits the low latency path, and the fourth exit control information indicates whether Retimer1 exits the low latency path.

A structure of the twelfth bitstream is the same as that of the ninth bitstream. For the structure and related descriptions of the twelfth bitstream, refer to those of the ninth bitstream shown in FIG. 10 and the content in Table 3. Details are not described again in this embodiment of this application.

325: Retimer1 writes third state information into the second state field in the received twelfth bitstream, to obtain a thirteenth bitstream, where the third state information indicates whether Retimer1 enters the low latency path or exits the low latency path.

For this procedure, refer to the procedure 322. Details are not described again in this embodiment of this application.

326: Retimer1 sends the thirteenth bitstream to Retimer0.

For example, in this procedure, a value of an RT1_LT_SW subfield in a second state field of the thirteenth bitstream sent by Retimer1 to Retimer0 is 0.

327: Retimer0 writes fourth state information into a second state field in the received thirteenth bitstream, to obtain a fourteenth bitstream, where the fourth state information indicates whether Retimer0 enters the low latency path or exits the low latency path.

For this procedure, refer to the procedure 320. Details are not described again in this embodiment of this application.

328: Retimer0 sends the fourteenth bitstream to the first device.

For example, in this procedure, a value of an RT1_LT_SW subfield in a second state field of the fourteenth bitstream sent by Retimer0 to the first device is 0, and a value of an RT0_LT_SW subfield is 1.

329: Retimer0 determines, based on the first enter control information and/or the third enter control information, whether to enter the low latency path.

The procedures 319 to 323 are a path control process of the first device on Retimer0 and Retimer1. The procedures 324 to 328 are a path control process of the second device on Retimer0 and Retimer1. There is no sequence between the path control processes of the first device and the second device on Retimer0 and Retimer1. The two path control processes may be performed at the same time.

A process in which Retimer0 determines whether to enter the low latency path corresponds to the process in which Retimer0 determines whether to enable the low latency path in the procedure 317. In an implementation corresponding to the procedure 317, Retimer0 may determine, based on any one of the first enter control information and the third enter control information, whether to enter both the two low latency paths. For example, Retimer0 may determine, based on enter control information included in an earlier received bitstream in the ninth bitstream and the thirteenth bitstream, whether to enter both the two low latency paths. For example, Retimer0 first receives the ninth bitstream, and may determine, based on the first enter control information included in the ninth bitstream, whether to enter both the two low latency paths. It is assumed that the first enter control information indicates Retimer0 to enter the low latency paths (that is, the value of the RT0_ENTER_LT subfield is 1), and both the two low latency paths are entered.

In this implementation, the procedure 329 may be performed after Retimer0 first receives the bitstreams. There is no sequence between the processes of writing state information into the bitstreams and forwarding the received bitstreams and the procedure 329, and the processes and the procedure may be performed at the same time. For example, Retimer0 first receives the ninth bitstream, after receiving the ninth bitstream, the procedure 329 may be performed, and the procedures 320 and 321 are performed at the same time.

In another implementation corresponding to the procedure 317, Retimer0 may determine, based on the first enter control information and the third enter control information, whether to enter the two low latency paths. For example, Retimer0 may determine, based on the first enter control information and the third enter control information, whether to enter both the two low latency paths. Optionally, Retimer0 may perform an AND logical operation or an OR logical operation on the first enter control information and the third enter control information, and determine, based on a result of the AND logical operation or the OR logical operation, whether to enter both the two low latency paths. A logical operation manner may be consistent with the logical operation manner in the procedure 317.

For example, it is assumed that the first enter control information indicates Retimer0 to enter the low latency paths (that is, the value of the RT0_ENTER_LT subfield is 1). The third enter control information indicates Retimer0 not to enter the low latency paths (that is, the value of the RT0_ENTER_LT subfield is 0). Retimer0 performs the AND operation on the first enter control information and the third enter control information, and determines not to enter the two low latency paths. Alternatively, Retimer0 performs the OR operation on the first enter control information and the third enter control information, and determines to enter the two low latency paths.

In another example corresponding to the procedure 317, Retimer0 may separately and independently determine, based on the first enter control information and the third enter control information, whether to enter the two low latency paths. In other words, Retimer0 may determine, based on the first enter control information, whether to enter one low latency path, and determine, based on the third enter control information, whether to enter the other low latency path. Optionally, the first path control field may further include first direction information, and the second path control field may further include second direction information. The first direction information is different from the second direction information. The first direction information indicates a transmission direction corresponding to a low latency path entered based on the first enter control information. The second direction information indicates a transmission direction corresponding to a low latency path entered based on the third enter control information. Retimer0 may determine, based on the first enter control information, whether to enter the low latency path corresponding to the transmission direction indicated by the first direction information, and determine, based on the third enter control information, whether to enter the low latency path corresponding to the transmission direction indicated by the second direction information. For example, it is assumed that the first enter control information indicates Retimer0 to enter the low latency paths (that is, the value of the RT0_LT_EN subfield is 1). The first direction information indicates a transmission direction from the second device to the first device. Retimer0 may determine to enter a low latency path corresponding to the transmission direction from the second device to the first device. The third enter control information indicates not to enter the low latency paths of Retimer0 (that is, the value of the RT1_LT_EN subfield is 0). The second direction information indicates a transmission direction from the first device to the second device. Retimer0 may determine not to enter a low latency path corresponding to the transmission direction from the first device to the second device.

Still optionally, corresponding to the procedure 317, Retimer0 may directly determine, based on the first enter control information, whether to enter a low latency path corresponding to a transmission direction of the ninth bitstream, and determine, based on the third enter control information, whether to enter a low latency path corresponding to a transmission direction of the thirteenth bitstream. For example, it is assumed that the first enter control information indicates Retimer0 to enter the low latency paths (that is, the value of the RT0_LT_EN subfield is 1). Retimer0 may determine to enter the low latency path corresponding to the transmission direction from the first device to the second device. The third enter control information indicates not to enter the low latency paths of Retimer0 (that is, the value of the RT1_LT_EN subfield is 0). Retimer0 may determine not to enter control the low latency path corresponding to the transmission direction from the first device to the second device.

In this implementation, the procedure 329 may be performed after Retimer0 receives the two bitstreams. There is no sequence between the processes of writing state information into the bitstreams and forwarding the received bitstreams and the procedure 329, and the processes and the procedure may be performed at the same time. For example, the procedure 328 may be performed after Retimer0 receives the ninth bitstream and the thirteenth bitstream, and the procedures 320, 321, 327, and 328 may be performed at the same time.

330: Retimer1 determines, based on the second enter control information and/or the fourth enter control information, whether to enter the low latency path.

For this procedure, refer to the procedure 329. Details are not described again in this embodiment of this application.

It should be noted that the procedures 319 to 330 may be repeatedly performed for a plurality of times, that is, the first device may send a plurality of ninth bitstreams to Retimer0, and the second device may send a plurality of twelfth bitstreams to Retimer1.

When determining, based on any received fourteenth bitstream, that no retimer (including Retimer0 and Retimer1) enters the low latency paths or exits the low latency paths, the first device determines that the link establishment process ends. In this case, the first device may start to send service data to the second device through the retimer. Similarly, when determining, based on any received eleventh bitstream, that no retimer (including Retimer0 and Retimer1) enters the low latency paths or exits the low latency paths, the second device determines that the link establishment process ends. In this case, the second device may start to send service data to the first device through the retimer.

Optionally, in the foregoing processes, it is assumed that any retimer (for example, Retimer0) determines, based on the first enter control information and the third enter control information, to enter the two low latency paths, and then starts to enter the two low latency paths. In a process of entering the two low latency paths, Retimer0 may first stop sending the tenth bitstream to Retimer1 and stop sending the fourteenth bitstream to the first device, independently generate a fifteenth bitstream, and send the fifteenth bitstream to the first device and the second device. The fifteenth bitstream may be an RTSB. For a structure and related descriptions of the fifteenth bitstream, refer to FIG. 10 and Table 3. Details are not described again in this embodiment of this application. After completing the process of entering the low latency path, Retimer0 may start to send the tenth bitstream to Retimer1 and start to send the fourteenth bitstream to the first device.

If Retimer0 or Retimer1 enters the low latency path in the foregoing process, the service data is forwarded through the low latency paths. If Retimer0 or Retimer1 does not enter the low latency path in the foregoing process, the service data is forwarded on the normal data paths.

It should be noted that, because there are small differences between time and frequency at which the first device sends the ninth bitstream and time and frequency at which the second device sends the twelfth bitstream, the first device and the second device almost simultaneously determine that the link establishment process ends, and the first device and the second device may transmit the service data through the retimer.

Optionally, if the sixth bitstream received by the first device includes the first duration information and the second duration information, the first device may determine first waiting duration based on the first duration information and the second duration information. After the first waiting duration following a first start moment, when receiving a first quantity of fourteenth bitstreams, the first device determines that the link establishment process ends, and sends the service data to the second device through the retimer. The first start moment may be a moment at which the first device sends a first ninth bitstream, or a moment at which the first device receives a first fourteenth bitstream. This is not limited in this embodiment of this application. The first waiting duration may be $(1+N \%)*T$, where N is a user-defined coefficient, and T is the first duration information or the second duration information. For example, T may be a largest value between the first duration information and the second duration information.

Alternatively, the second device may determine second waiting duration based on the first duration information and the second duration information that are included in the received third bitstream. After the second waiting duration following a second start moment, when receiving a second quantity of eleventh bitstreams, the second device determines that the link establishment process ends, and sends the service data to the first device through the retimer. The second start moment may be a moment at which the second device sends a first twelfth bitstream, or a moment at which the second device receives a first eleventh bitstream. This is not limited in this embodiment of this application. For a process of determining the second waiting duration, refer to the foregoing content. Details are not described again in this embodiment of this application.

Figure 11:
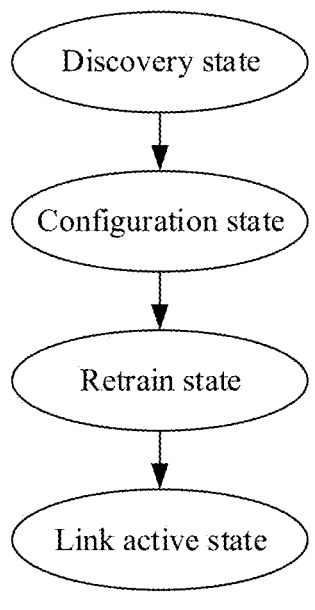
FIG. 11 is a diagram of state switching according to an embodiment of this application.

As shown in FIG. 3, the LTR_CTRL component is configured to control a state of the first device or the second device in the foregoing method process. For example, FIG. 11 is a diagram of state switching according to an embodiment of this application. In this embodiment of this application, FIG. 11 is used as an example to describe a state of the first device or the second device in the foregoing entire method process. As shown in FIG. 11, state switching of the first device or the second device is as follows: a discovery state—a configuration state—a retrain state—a link active state.

Figure 12:
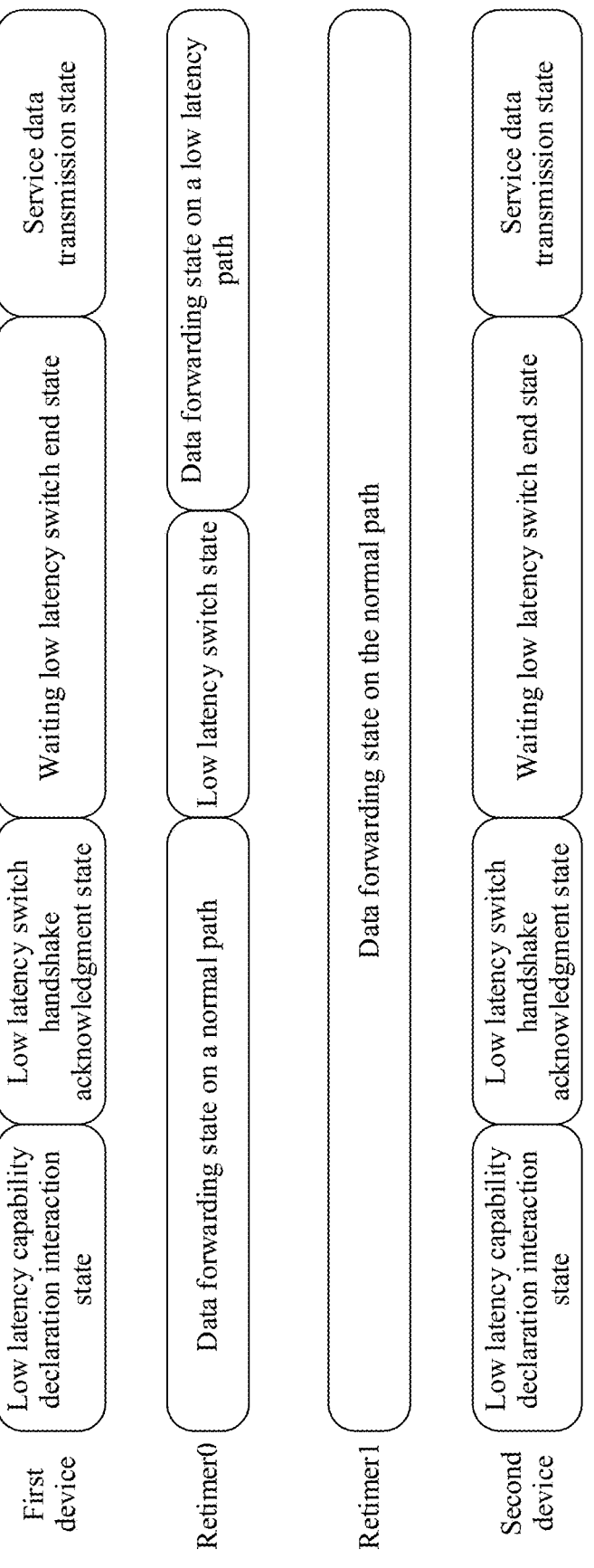
FIG. 12 is another diagram of state switching according to an embodiment of this application.

As shown in FIG. 4, the Low_latency_switch_ctrl component is configured to control the state of the retimer (including Retimer0 and Retimer1) in the foregoing method process. For example, FIG. 12 is another diagram of state switching according to an embodiment of this application. In this embodiment of this application, FIG. 12 is used as an example to describe states of the first device, Retimer0, Retimer1, and the second device in the foregoing entire method process. It is assumed that Retimer0 is controlled to enter a low latency path and Retimer1 is controlled not to enter a low latency path.

As shown in FIG. 12, during the procedures 301 to 310, both the first device and the second device are in a low latency capability declaration interaction state, and both Retimer0 and Retimer1 are in a data forwarding state on a normal path. When the first device receives a third quantity of sixth bitstreams, the low latency capability declaration interaction state is switched to a low latency switch handshake acknowledgment state. When the second device receives a third quantity of third bitstreams, the low latency capability declaration interaction state is switched to the low latency switch handshake acknowledgment state.

During the procedures 311 to 318, both the first device and the second device are in the low latency switch handshake acknowledgment state, and both Retimer0 and Retimer1 are in the data forwarding state on the normal path. When the first device receives a fourth quantity of eighth bitstreams, the low latency switch handshake acknowledgment state is switched to a waiting low latency switch end state. When the second device receives a fourth quantity of seventh bitstreams, the low latency switch handshake acknowledgment state is switched to the waiting low latency switch end state. When the first device or the second device is switched to the waiting low latency switch end state, Retimer0 switches from the data forwarding state on the normal path to the low latency switch state, and Retimer1 is still in the data forwarding state on the normal path.

During the procedures 319 to 330, both the first device and the second device are in the waiting low latency switch end state, Retimer0 is in the low latency switch state, and Retimer1 is in the data forwarding state on the normal path. When the first device receives a fifth quantity of fourteenth bitstreams, the waiting low latency switch end state is switched to a service data transmission state. When the second device receives a fifth quantity of eleventh bitstreams, the waiting low latency switch end state is switched to the service data transmission state. After entering the low latency path, Retimer0 may switch from the low latency switch state to a data forwarding state on a low latency path. Retimer1 is still in the data forwarding state on the normal path.

Optionally, after the first waiting duration following the first start moment, when receiving the first quantity of fourteenth bitstreams, the first device may alternatively switch from the waiting low latency switch end state to the service data transmission state. Alternatively, after the second waiting duration following the second start moment, when receiving the second quantity of the eleventh bitstreams, the second device may switch from the waiting low latency switch end state to the service data transmission state. For the first start moment, the first waiting duration, the second start moment, and the second waiting duration, refer to the foregoing content. Details are not described again in this embodiment of this application.

A sequence of the method provided in embodiments of this application may be appropriately adjusted, and procedures may also be correspondingly added or deleted based on a situation. For example, the procedure 301 and the procedure 306 may be performed at the same time, the procedure 311 and the procedure 314 may be performed at the same time, and the procedure 319 and the procedure 324 may be performed at the same time. Any variation readily figured out by a person skilled in the art within the technical scope disclosed in this application shall fall within the protection scope of this application. This is not limited in this embodiment of this application.

Figure 13A:
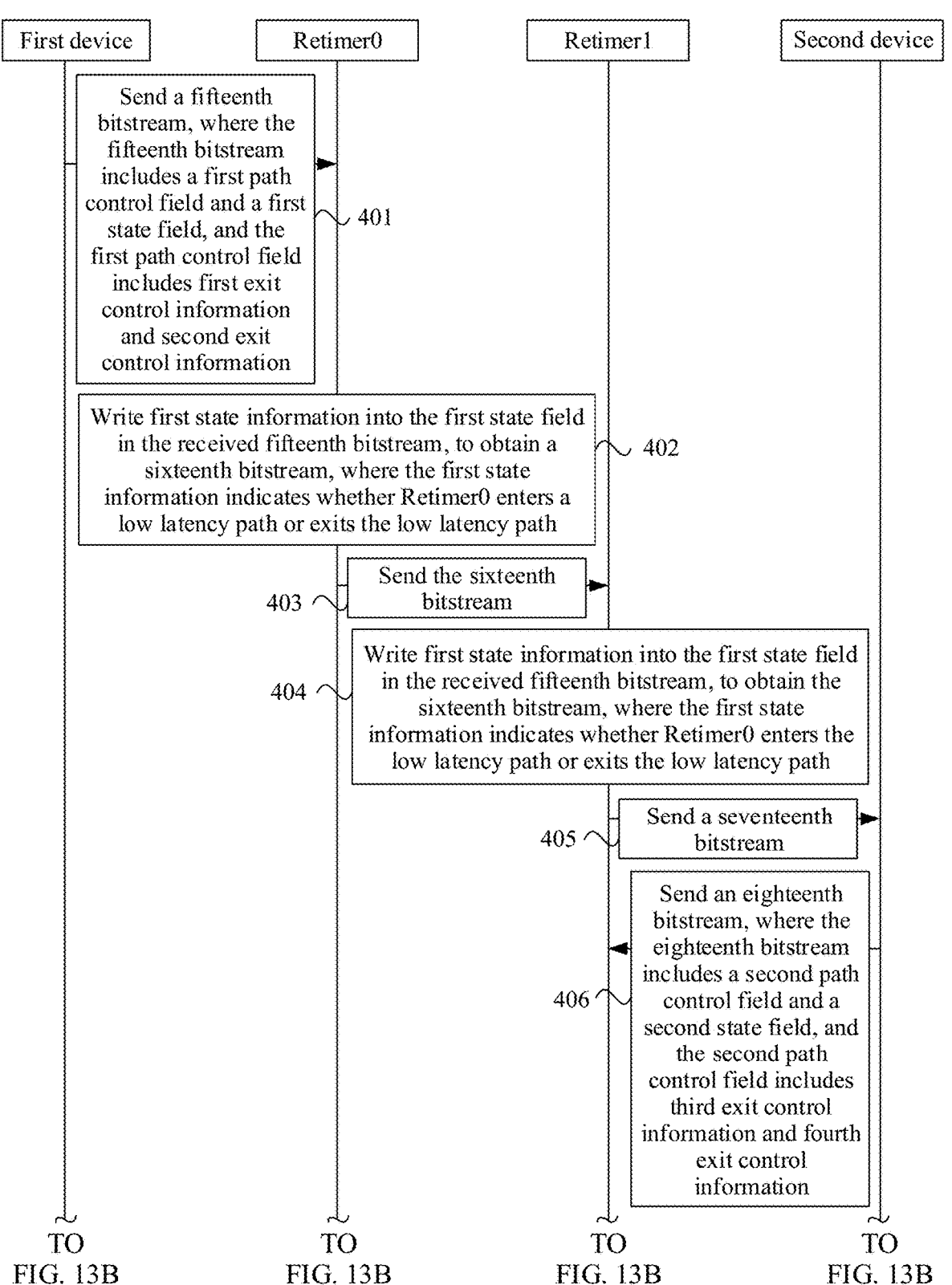

FIG. 13A and FIG. 13B are a schematic flowchart of still another retimer path control method for wired serial data transmission according to an embodiment of this application. After some or all retimers are controlled to enter a low latency path in the procedure 301 to the procedure 330, if a link establishment process is required to be re-performed (for example, an exit instruction is received or a link is faulty), the link establishment process is required to be first entered to control a retimer that has entered a low latency path to exit the low latency path, then a retimer that is required to enter a low latency path is re-determined, and the retimer is controlled to enter the low latency path. In this embodiment of this application, FIG. 13A and FIG. 13B are used as an example to describe a process of controlling whether a retimer exits a low latency path. In an example in which Retimer0 is controlled to exit a low latency path and Retimer1 is controlled not to exit a low latency path, the method may include the following procedures.

401: A first device sends a fifteenth bitstream to Retimer0, where the fifteenth bitstream includes a first path control field and a first state field, and the first path control field includes first exit control information and second exit control information.

The first exit control information indicates whether Retimer0 exits the low latency path, and the second exit control information indicates whether Retimer1 exits the low latency path.

If the link establishment process is re-performed based on the received exit instruction, the retimer that is required to exit and the retimer that may not exit may be determined based on the exit instruction, so as to determine the first exit control information and the second exit control information. If the link establishment process is re-performed due to a link fault, the retimer that is already in the low latency path may be controlled to exit the low latency path, so as to determine the first exit control information and the second exit control information.

For a structure and related descriptions of the fifteenth bitstream, refer to FIG. 10 and Table 3. Details are not described again in this embodiment of this application. In this embodiment of this application, a value of an RT0_EXIT_LT subfield may be 1, and a value of the RT1_EXIT_LT subfield may be 0.

402: Retimer0 writes first state information into the first state field in the received fifteenth bitstream, to obtain a sixteenth bitstream, where the first state information indicates whether Retimer0 enters the low latency path or exits the low latency path.

For this procedure, refer to the procedure 320. Details are not described again in this embodiment of this application.

403: Retimer0 sends the sixteenth bitstream to Retimer1.

404: Retimer1 writes second state information into a first state field in the received sixteenth bitstream, to obtain a seventeenth bitstream, where the second state information indicates whether Retimer1 enters the low latency path or exits the low latency path.

For this procedure, refer to the procedure 322. Details are not described again in this embodiment of this application.

405: Retimer1 sends the seventeenth bitstream to the second device.

406: The second device sends an eighteenth bitstream to Retimer1, where the eighteenth bitstream includes a second path control field and a second state field, and the second path control field includes third exit control information and fourth exit control information.

The third exit control information indicates whether Retimer0 exits the low latency path, and the fourth exit control information indicates whether Retimer1 exits the low latency path. For a process in which the second device determines the third exit control information and the fourth exit control information, refer to the procedure 401. Details are not described again in this embodiment of this application.

For a structure and related descriptions of the eighteenth bitstream, refer to those of the fifth bitstream shown in FIG. 10 and the content in Table 3. Details are not described again in this embodiment of this application.

407: Retimer1 writes third state information into the second state field in the received eighteenth bitstream, to obtain a nineteenth bitstream, where the third state information indicates whether Retimer1 enters the low latency path or exits the low latency path.

For this procedure, refer to the procedure 322. Details are not described again in this embodiment of this application.

408: Retimer1 sends the nineteenth bitstream to Retimer0.

409: Retimer0 writes fourth state information into a second state field in the received nineteenth bitstream, to obtain a twentieth bitstream, where the fourth state information indicates whether Retimer0 enters the low latency path or exits the low latency path.

For this procedure, refer to the procedure 320. Details are not described again in this embodiment of this application.

410: Retimer0 sends the twentieth bitstream to the first device.

411: Retimer0 determines, based on the first exit control information and/or the third exit control information, whether to exit the low latency path.

The procedures 401 to 405 are a path control process of the first device on Retimer0 and Retimer1. The procedures 406 to 410 are a path control process of the second device on Retimer0 and Retimer1. There is no sequence between the path control processes of the first device and the second device on Retimer0 and Retimer1. The two path control processes may be performed at the same time.

A process in which Retimer0 determines whether to exit the low latency path corresponds to the process in which Retimer0 determines whether to enable the low latency path in the procedure 317. In an implementation corresponding to the procedure 317, Retimer0 may determine, based on any one of the first exit control information and the third exit control information, whether to exit both the two low latency paths.

In this implementation, the procedure 411 may be performed after Retimer0 first receives the bitstreams. There is no sequence between the processes of writing state information into the bitstreams and forwarding the received bitstreams and the procedure 411, and the processes and the procedure may be performed at the same time. For example, Retimer0 first receives the fifteenth bitstream, after receiving the fifteenth bitstream, the procedure 411 may be performed, and the procedures 402 and 403 are performed at the same time.

In another implementation corresponding to the procedure 317, Retimer0 may determine, based on the first exit control information and the third exit control information, whether to exit the two low latency paths. For example, Retimer0 may determine, based on the first exit control information and the third exit control information, whether to exit both the two low latency paths. Optionally, Retimer0 may perform an AND logical operation or an OR logical operation on the first exit control information and the third exit control information, and determine, based on a result of the AND logical operation or the OR logical operation, whether to exit both the two low latency paths. A logical operation manner may be consistent with the logical operation manner in the procedure 317.

For example, it is assumed that the first exit control information indicates Retimer0 to exit the low latency paths (that is, the value of the RT0_EXIT_LT subfield is 1). The third exit control information indicates Retimer0 not to exit the low latency paths (that is, the value of the RT0_EXIT_LT subfield is 0). Retimer0 performs the AND operation on the first exit control information and the third exit control information, and determines not to exit the two low latency paths. Alternatively, Retimer0 performs the OR operation on the first exit control information and the third exit control information, and determines to exit the two low latency paths.

In another example corresponding to the procedure 317, Retimer0 may separately and independently determine, based on the first exit control information and the third exit control information, whether to exit the two low latency paths. In other words, Retimer0 may determine, based on the first exit control information, whether to exit one low latency path, and determine, based on the third exit control information, whether to exit the other low latency path.

In this implementation, the procedure 411 may be performed after Retimer0 receives the two bitstreams. There is no sequence between the processes of writing state information into the bitstreams and forwarding the received bitstreams and the procedure 411, and the processes and the procedure may be performed at the same time. For example, the procedure 411 may be performed after Retimer0 receives the fifteenth bitstream and the nineteenth bitstream, and the procedures 402, 403, 409, and 410 may be performed at the same time.

In this embodiment of this application, an example in which Retimer0 exits the two low latency paths is used. In this case, Retimer0 is required to start to exit the low latency paths. As shown in FIG. 4, Retimer0 may switch the input end of the MUX from the low latency path to the normal data path.

412: Retimer1 determines, based on the second exit control information and/or the fourth exit control information, whether to exit the low latency path.

For this procedure, refer to the procedure 411. Details are not described again in this embodiment of this application.

It should be noted that the procedures 401 to 412 may be repeatedly performed for a plurality of times, that is, the first device may send a plurality of fifteenth bitstreams to Retimer0, and the second device may send a plurality of eighteenth bitstreams to Retimer1.

For the procedure 401 to the procedure 412, refer to the procedure 319 to the procedure 330. Details are not described again in this embodiment of this application.

When determining, based on any received twentieth bitstream, that no retimer (including Retimer0 and Retimer1) exits the low latency paths, the first device may re-perform the procedures 301 to 330, or may directly send service data to the second device through the retimer. Similarly, when determining, based on any received seventeenth bitstream, that no retimer (including Retimer0 and Retimer1) exits the low latency paths, the second device may re-perform the procedures 301 to 330, or may directly send service data to the first device through the retimer.

Optionally, after the first waiting duration following the first start moment, when receiving a first quantity of twentieth bitstreams, the first device may re-perform the procedures 301 to 330, or directly send the service data to the second device through the retimer. Alternatively, after the second waiting duration following the second start moment, when receiving a second quantity of seventeenth bitstreams, the second device may re-perform the procedures 301 to 330, or directly send the service data to the first device through the retimer. For this procedure, refer to the foregoing content. Details are not described again in this embodiment of this application.

As shown in FIG. 12, during the procedures 401 to 412, both the first device and the second device are in the waiting low latency switch end state, Retimer0 is in the low latency switch state, and Retimer1 is in the data forwarding state on the normal path. When the first device receives a fifth quantity of twentieth bitstreams, the waiting low latency switch end state is switched to the low latency capability declaration interaction state (that is, the procedures 301 to 330 are re-performed) or the service data transmission state (that is, the service data is sent to the second device through the retimer). When the second device receives a fifth quantity of seventeenth bitstreams, the waiting low latency switch end state is switched to the low latency capability declaration interaction state or the service data transmission state. After exiting the low latency path, Retimer0 may switch from the low latency switch state to the data forwarding state on the normal path. Retimer1 is still in the data forwarding state on the normal path.

Optionally, after the first waiting duration following the first start moment, when receiving the first quantity of twentieth bitstreams, the first device may alternatively switch from the waiting low latency switch end state to the low latency capability declaration interaction state or the service data transmission state. Alternatively, after the second waiting duration following the second start moment, when receiving the second quantity of the seventeenth bitstreams, the second device may switch from the waiting low latency switch end state to the low latency capability declaration interaction state or the service data transmission state. For this procedure, refer to the foregoing content. Details are not described again in this embodiment of this application.

A sequence of the method provided in embodiments of this application may be appropriately adjusted, and procedures may also be correspondingly added or deleted based on a situation. For example, the procedure 401 and the procedure 406 may be performed at the same time. Any variation readily figured out by a person skilled in the art within the technical scope disclosed in this application shall fall within the protection scope of this application. This is not limited in this embodiment of this application.

Figure 14A:
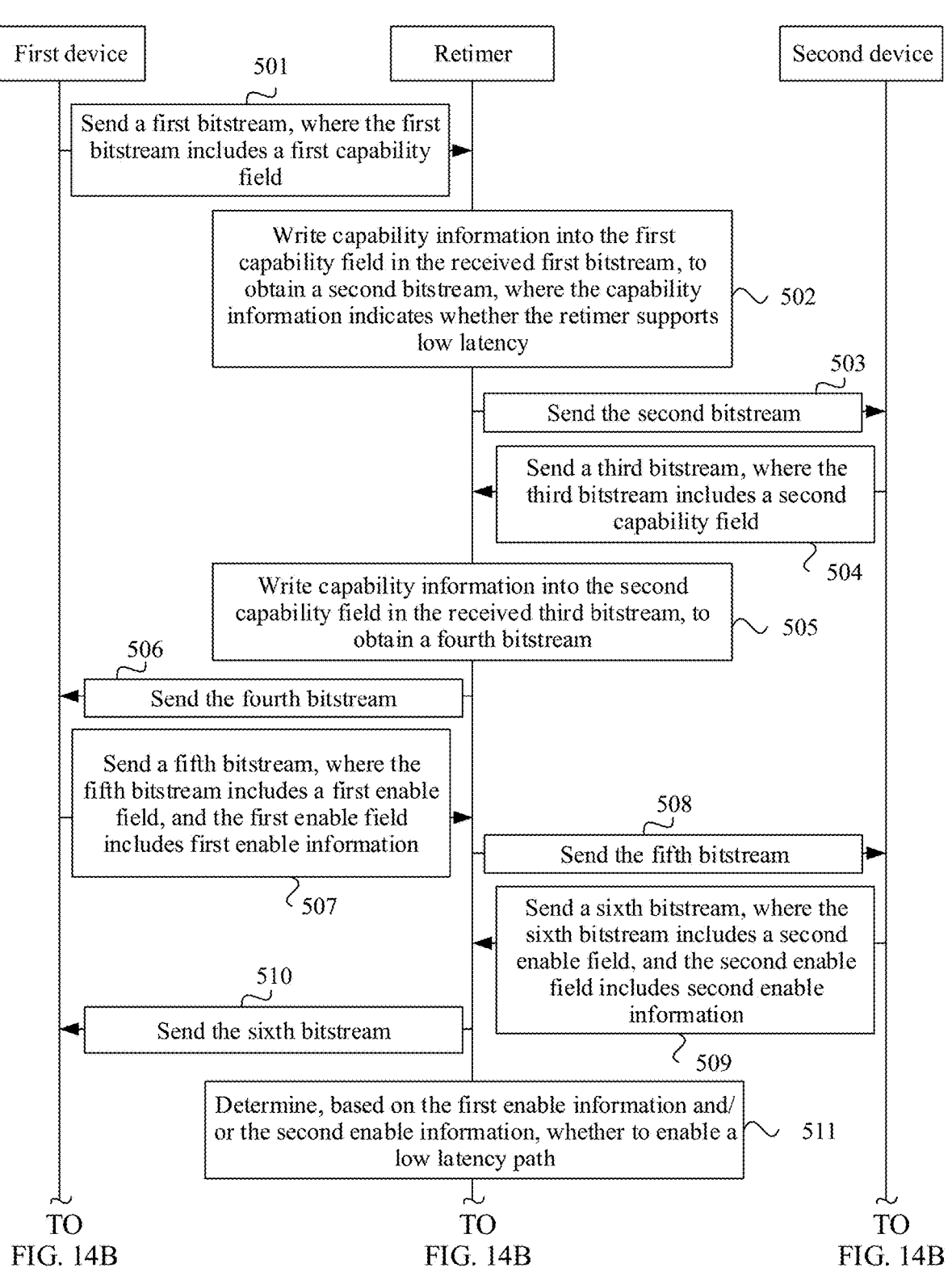
FIG. 14A and FIG. 14B are a schematic flowchart of yet another retimer path control method for wired serial data transmission according to an embodiment of this application.
Figure 14B:
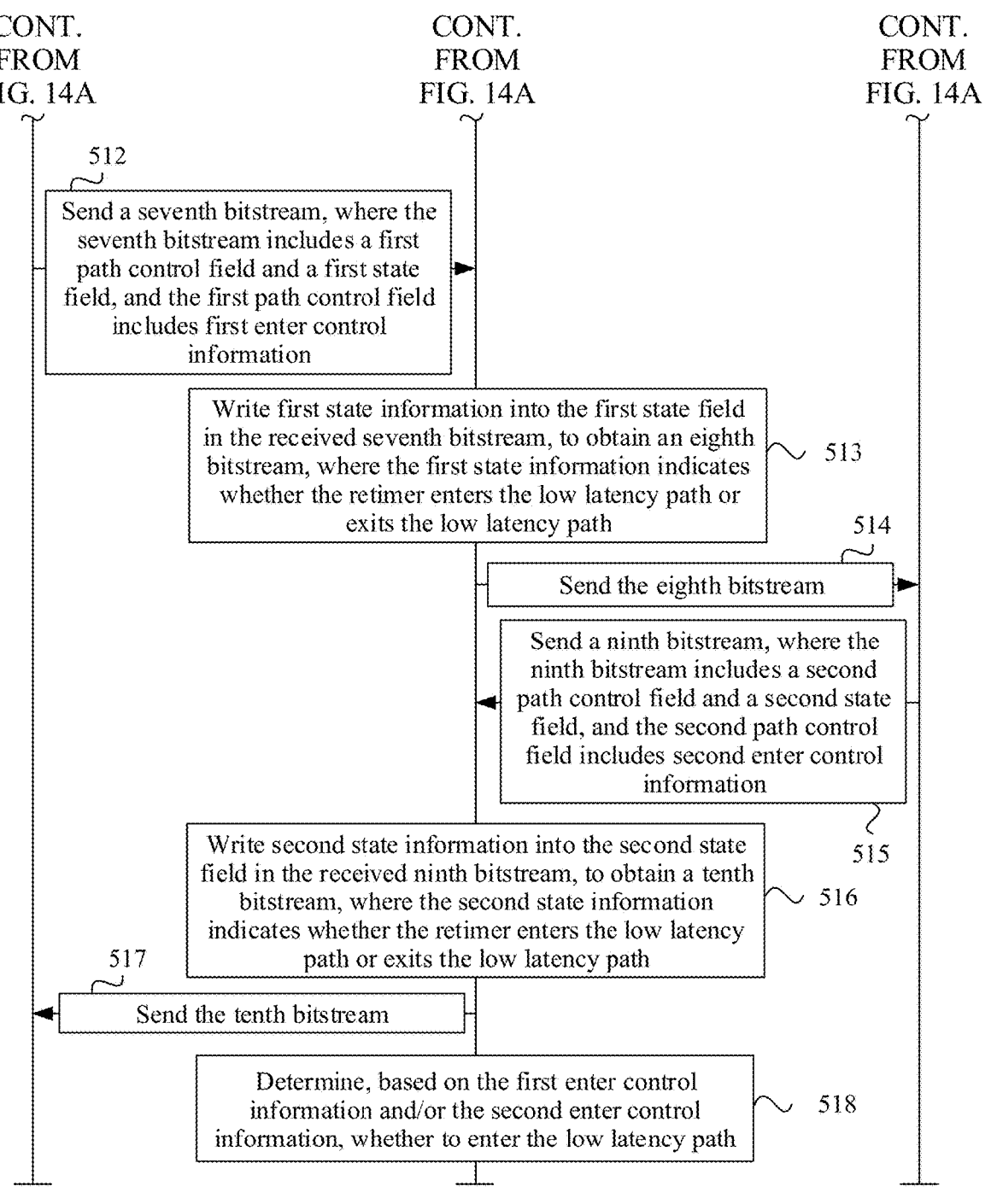

The procedures 301 to 330 and the procedures 401 to 412 are described by using an example in which paths of two retimers (including Retimer0 and Retimer1) are controlled. In this embodiment of this application, paths of one or more retimers may be further controlled. In a third embodiment, the path control method is described by using a first device, a retimer (referred to as a retimer below), and a second device as an example. FIG. 14A and FIG. 14B are a schematic flowchart of yet another retimer path control method for wired serial data transmission according to an embodiment of this application. FIG. 14A and FIG. 14B describe a process of controlling whether a retimer enters a low latency path. The method may include the following procedures.

501: The first device sends a first bitstream to the retimer, where the first bitstream includes a first capability field.

502: The retimer writes capability information into the first capability field in the received first bitstream, to obtain a second bitstream, where the capability information indicates whether the retimer supports a low latency path.

503: The retimer sends the second bitstream to the second device.

504: The second device sends a third bitstream to the retimer, where the third bitstream includes a second capability field.

505: The retimer writes the capability information into the second capability field in the received third bitstream, to obtain a fourth bitstream.

506: The retimer sends the fourth bitstream to the first device.

507: The first device sends a fifth bitstream to the retimer, where the fifth bitstream includes a first enable field, and the first enable field includes first enable information.

508: The retimer sends the fifth bitstream to the second device.

509: The second device sends a sixth bitstream to the retimer, where the sixth bitstream includes a second enable field, and the second enable field includes second enable information.

510: The retimer sends the sixth bitstream to the first device.

511: The retimer determines, based on the first enable information and/or the second enable information, whether to enable the low latency path.

512: The first device sends a seventh bitstream to the retimer, where the seventh bitstream includes a first path control field and a first state field, and the first path control field includes first enter control information.

513: The retimer writes first state information into the first state field in the received seventh bitstream, to obtain an eighth bitstream, where the first state information indicates whether the retimer enters the low latency path or exits the low latency path.

514: The retimer sends the eighth bitstream to the second device.

515: The second device sends a ninth bitstream to the retimer, where the ninth bitstream includes a second path control field and a second state field, and the second path control field includes second enter control information.

516: The retimer writes second state information into the second state field in the received ninth bitstream, to obtain a tenth bitstream, where the second state information indicates whether the retimer enters the low latency path or exits the low latency path.

517: The retimer sends the tenth bitstream to the first device.

518: The retimer determines, based on the first enter control information and/or the second enter control information, whether to enter the low latency path.

For the procedures 501 to 518, refer to related content of the procedures 301 to 330. Details are not described again in this embodiment of this application.

A sequence of the method provided in embodiments of this application may be appropriately adjusted, and procedures may also be correspondingly added or deleted based on a situation. For example, the procedure 501 and the procedure 504 may be performed at the same time, the procedure 507 and the procedure 509 may be performed at the same time, and the procedure 512 and the procedure 515 may be performed at the same time. Any variation readily figured out by a person skilled in the art within the technical scope disclosed in this application shall fall within the protection scope of this application. This is not limited in this embodiment of this application.

Figure 15:
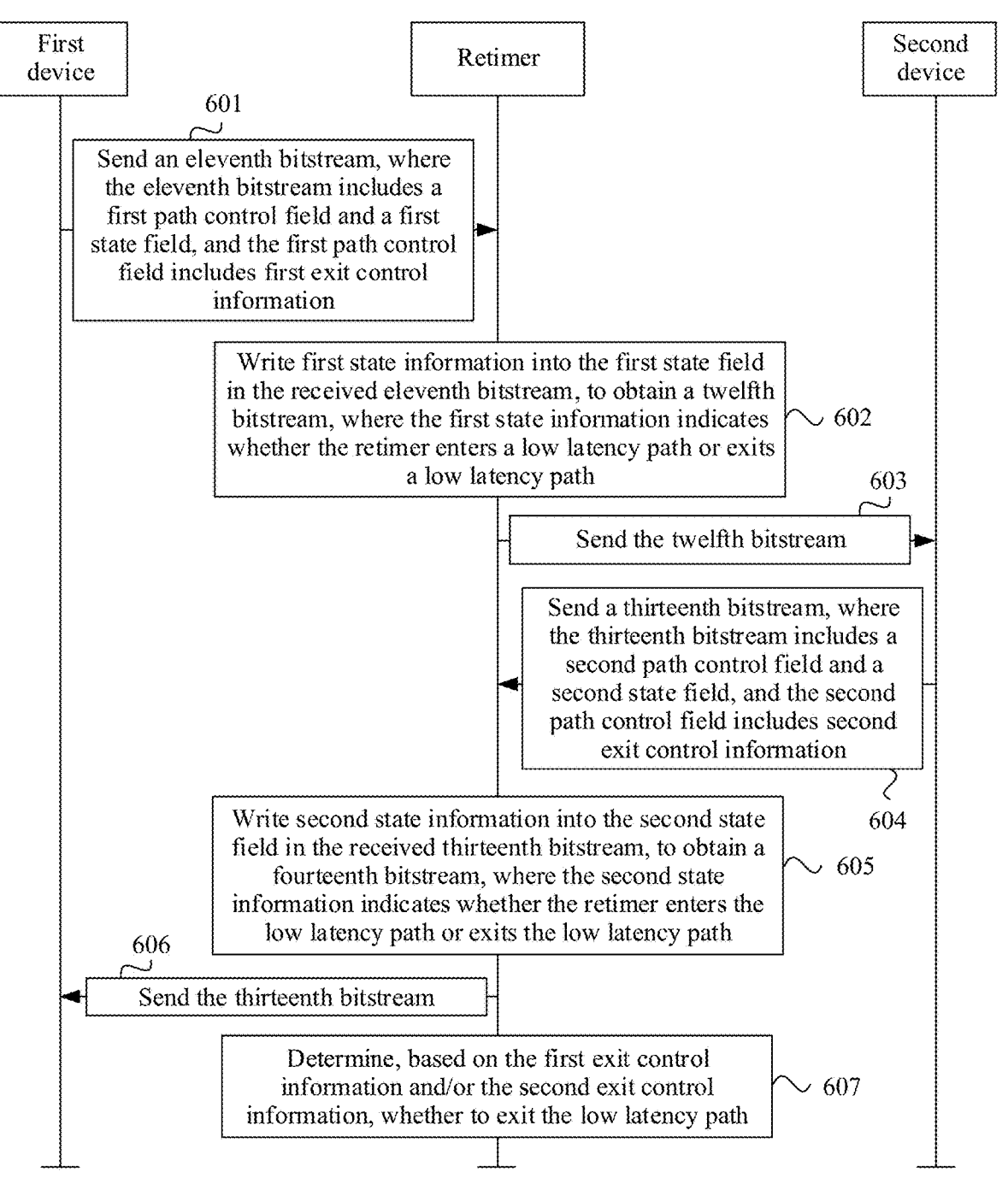
FIG. 15 is a schematic flowchart of still yet another retimer path control method for wired serial data transmission according to an embodiment of this application.

FIG. 15 is a schematic flowchart of still yet another retimer path control method for wired serial data transmission according to an embodiment of this application. After the retimer is controlled to enter the low latency path in the procedure 501 to the procedure 518, if a link establishment process is required to be re-performed (for example, an exit instruction is received or a link is faulty), the link establishment process is required to be first entered to control the retimer to exit the low latency path, and then the retimer is re-controlled to enter the low latency path. In this embodiment of this application, FIG. 15 is used as an example to describe a process of controlling whether the retimer exits the low latency path. The method may include the following procedures.

601: The first device sends an eleventh bitstream to the retimer, where the eleventh bitstream includes a first path control field and a first state field, and the first path control field includes first exit control information.

602: The retimer writes first state information into the first state field in the received eleventh bitstream, to obtain a twelfth bitstream, where the first state information indicates whether the retimer enters the low latency path or exits the low latency path.

603: The retimer sends the twelfth bitstream to the second device.

604: The second device sends a thirteenth bitstream to the retimer, where the thirteenth bitstream includes a second path control field and a second state field, and the second path control field includes second exit control information.

605: The retimer writes second state information into the second state field in the received thirteenth bitstream, to obtain a fourteenth bitstream, where the second state information indicates whether the retimer enters the low latency path or exits the low latency path.

606: The retimer sends the thirteenth bitstream to the first device.

607: The retimer determines, based on the first exit control information and/or the second exit control information, whether to exit the low latency path.

For the procedures 601 to 607, refer to related content of the procedures 401 to 412. Details are not described again in this embodiment of this application.

A sequence of the method provided in embodiments of this application may be appropriately adjusted, and procedures may also be correspondingly added or deleted based on a situation. For example, the procedure 601 and the procedure 604 may be performed at the same time. Any variation readily figured out by a person skilled in the art within the technical scope disclosed in this application shall fall within the protection scope of this application. This is not limited in this embodiment of this application.

According to the retimer path control method for wired serial data transmission provided in this embodiment of this application, a first device sends a bitstream including a first capability field to a second device through at least one retimer. The at least one retimer writes capability information into the first capability field when forwarding the received bitstream to the second device. The second device sends a bitstream including a second capability field to the first device through the at least one retimer. The at least one retimer writes the capability information into the second capability field when forwarding the received bitstream to the first device. The first device determines, based on the capability information carried in the received bitstream, enable information separately corresponding to the at least one retimer, and sends a bitstream including a first enable field to the second device through the at least one retimer. The first enable field includes the enable information separately corresponding to the at least one retimer. The second device determines, based on the capability information carried in the received bitstream, the enable information separately corresponding to the at least one retimer, and sends, to the first device through the at least one retimer, a fourth bitstream that includes a second enable field. The second enable field includes the enable information separately corresponding to the at least one retimer. The retimer determines, based on the corresponding enable information carried in the received bitstream sent by the first device and/or the second device, whether to enable the low latency path. Then, the first device sends a bitstream including a first path control field to the second device through the at least one retimer. The first path control field includes enter control information separately corresponding to the at least one retimer. The second device sends, to the first device through the at least one retimer, a bitstream including a second path control field. The second path control field includes the enter control information separately corresponding to the at least one retimer. The retimer determines, based on the corresponding enter control information carried in the received bitstream sent by the first device and/or the second device, whether to enter the low latency path. Further, the first device may control, based on the first path control field in the bitstream, whether the retimer exits the low latency path, and the second device may control, based on the second path control field in the bitstream, whether the retimer exits the low latency path. The first device and the second device may implement path control on the at least one retimer through interaction of bitstreams, and the retimer may not send an indication bitstream to the communication devices, thereby preventing the device from becoming abnormal caused by the indication bitstream. When a status of a communication link is poor, the retimer may be controlled to exit the low latency path, so that an equalization state of the link establishment phase is re-entered, and equalization of the link is performed in the equalization state, that is, an equalization feature is redone, thereby ensuring that the communication link is in a good state.

The bitstreams for interaction between the first device and the second device each may be a TSB. The bitstream is obtained by adding a field to an existing TSB without changing a format of the existing TSB. In this way, the method can be applied to a high-speed I/O protocol. An apparatus to which the method is applied can be directly expanded to a high-speed serial interface (for example, a PCIe interface and an Ethernet interface), to implement native interconnection with the retimer, and effectively control paths of retimers having different types of low latency paths. The method is widely applicable without affecting other functions and features of the retimers. In addition, the TSB does not cause abnormality of the first device or second device.

Further, when there are a plurality of retimers between the first device and the second device, the first device and the second device may separately control a path of each retimer based on bitstreams, that is, may flexibly control which retimer enters or exits a low latency path, thereby improving flexibility of a control process.

In addition, the bitstream including the first path control field may further include a first state field. After determining whether to enter the low latency path, the retimer may further write state information into the first state field, and then forward the bitstream into which the state information is written to the second device. The state information indicates whether the retimer enters the low latency path or exits the low latency path. The bitstream including the second path control field may further include a second state field. After determining whether to enter the low latency path, the retimer may further write state information into the second state field, and then forward the bitstream into which the state information is written to the first device. The first device may determine, based on the second state information carried in the received bitstream, whether the retimer completes entering the low latency path or exiting the low latency path. The second device may also determine, based on the first state information carried in the received bitstream, whether the retimer completes entering the low latency path or exiting the low latency path. In a path control process of the retimer, the local device and the peer device are required to wait for the retimer to enter or exit the low latency path. The local device and the peer device may determine, based on the respective state information received by the local device and the peer device, whether to end this waiting process, and determine whether to perform subsequent service data transmission or whether to re-perform a link establishment process. This avoids a case in which the local device and the peer device stay in the waiting process, and avoids timeout in establishment of the communication link between the first device and the second device.

The foregoing describes the retimer path control method for wired serial data transmission provided in embodiments of this application from a perspective of interaction between devices. It may be understood that, to implement the foregoing functions, each device includes a corresponding hardware structure and/or a corresponding software module for performing each function. A person of ordinary skill in the art should easily be aware that, in combination with algorithms and steps in the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, functional modules of each device may be obtained through division according to the foregoing method example. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 16:
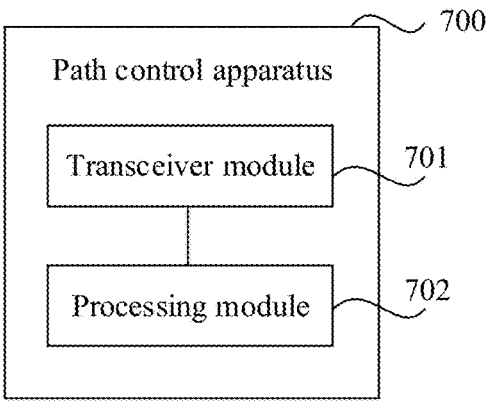
FIG. 16 is a block diagram of a retimer path control apparatus for wired serial data transmission according to an embodiment of this application.

FIG. 16 is a block diagram of a retimer path control apparatus for wired serial data transmission according to an embodiment of this application. When functional modules are obtained through division based on corresponding functions, the path control apparatus 700 may include a transceiver module 701 and a processing module 702. For example, the path control apparatus may be a first device, a second device, or a retimer, or may be a chip in a path control apparatus, or another combined component or part that has a function of a path control apparatus. When the path control apparatus 700 is the first device, the second device, or the retimer, the transceiver module 701 may be a transceiver, and the transceiver may include an antenna, a radio frequency circuit, and the like; and the processing module 702 may be a processor (or a processing circuit), for example, a baseband processor, and the baseband processor may include one or more central processing units (CPUs). When the path control apparatus 700 is a component or a part having the function, the transceiver module 701 may be a radio frequency unit, and the processing module 702 may be a processor (or a processing circuit), for example, a baseband processor. When the path control apparatus 700 is a chip system, the transceiver module 701 may be an input/output interface of a chip (for example, a baseband chip); and the processing module 702 may be a processor (or a processing circuit) of the chip system, and may include one or more central processing units. It should be understood that the transceiver module 701 in this embodiment of this application may be implemented by a transceiver or a transceiver-related circuit component; and the processing module 702 may be implemented by a processor or a processor-related circuit component (or referred to as a processing circuit).

For example, when the path control apparatus 700 is a chip or a functional unit of the first device or the second device, the transceiver module 701 may be configured to perform all sending and receiving operations performed by the first device or the second device in the embodiments shown in FIG. 6, FIG. 7A to FIG. 7D, FIG. 13A, FIG. 13B, FIG. 14A, FIG. 14B, or FIG. 15, and/or configured to support another process of the technology described in this specification. The processing module 702 may be configured to perform all operations performed by the first device or the second device in the embodiments shown in FIG. 6, FIG. 7A to FIG. 7D, FIG. 13A, FIG. 13B, FIG. 14A, FIG. 14B, or FIG. 15, except the sending and receiving operations, and/or another process used to support the technology described in this specification.

The transceiver module 701 may include a sending module and/or a receiving module, which are respectively configured to perform sending and receiving operations performed by the first device or the second device in the embodiments shown in FIG. 6, FIG. 7A to FIG. 7D, FIG. 13A, FIG. 13B, FIG. 14A, FIG. 14B, or FIG. 15. The path control apparatus includes:

a transceiver module, configured to receive a first bitstream. The first bitstream includes a first field. The first field includes capability information of the retimer. The capability information indicates whether the retimer supports a low latency path.

The transceiver module is further configured to send a second bitstream to the retimer. The second bitstream includes a second field. The second field includes first enter control information. The first enter control information indicates whether the retimer enters the low latency path. The low latency path is a path with lowest latency in data transmission paths of the retimer.

With reference to the foregoing solution, the second field further includes first exit control information, and the first exit control information indicates whether the retimer exits the low latency path.

With reference to the foregoing solution, the transceiver module is further configured to send a third bitstream to the retimer, where the third bitstream includes a third field, and the third field carries the capability information.

With reference to the foregoing solution, the transceiver module is further configured to receive a fourth bitstream. The fourth bitstream includes a fourth field. The fourth field includes second enter control information and second exit control information. The second enter control information indicates whether the retimer enters the low latency path. The second exit control information indicates whether the retimer exits the low latency path.

With reference to the foregoing solution, the second bitstream further includes a fifth field. The fifth field carries state information. The state information indicates whether the retimer enters the low latency path or exits the low latency path.

With reference to the foregoing solution, the fourth bitstream further includes a sixth field, and the sixth field includes the state information.

With reference to the foregoing solution, the transceiver module is further configured to send service data to a peer device through the retimer when it is determined, based on the state information, that the retimer does not enter the low latency path or exit the low latency path.

With reference to the foregoing solution, the first bitstream further includes a seventh field. The seventh field includes duration information. The duration information indicates consumed duration for the retimer to enter or exit the low latency path.

With reference to the foregoing solution, the path control apparatus further includes: a processing module, configured to determine waiting duration based on the duration information. The transceiver module is further configured to: send the service data to the peer device through the retimer when a first quantity of fourth bitstreams are received after the waiting duration following a start moment.

With reference to the foregoing solution, the transceiver module is further configured to send a fifth bitstream to the retimer. The fifth bitstream includes an eighth field. The eighth field includes first enable information. The first enable information indicates whether the retimer enables the low latency path.

With reference to the foregoing solution, the transceiver module is further configured to receive a sixth bitstream. The sixth bitstream includes a ninth field. The ninth field includes second enable information. The second enable information indicates whether to enable the low latency path.

With reference to the foregoing solution, the processing module is further configured to: when the second enable information is different from the first enable information, update the first enable information based on the second enable information, to obtain updated first enable information, where the updated first enable information is the same as the second enable information. The transceiver module is further configured to send an updated fifth bitstream to the retimer. The updated fifth bitstream includes an updated first enable field, and the updated first enable field includes the updated first enable information.

With reference to the foregoing solution, the transceiver module is specifically configured to: receive the first bitstream in a first state; and send the third bitstream to the retimer in the first state. The processing module is further configured to: when a second quantity of first bitstreams are received, jump from the first state to the second state. The transceiver module is specifically configured to: send the fifth bitstream to the retimer in the second state; and receive the sixth bitstream in the second state. The processing module is further configured to: when a third quantity of sixth bitstreams are received, jump from the second state to the third state. The transceiver module is specifically configured to: send the second bitstream to the retimer in the third state; and receive the fourth bitstream in the third state.

With reference to the foregoing solution, the processing module is further configured to: obtain enable configuration information of the retimer, where the enable configuration information indicates whether to enable a low latency capability of the retimer. The first enter control information is determined based on the capability information and the enable configuration information.

For example, when the path control apparatus 700 is a chip or a functional unit of the retimer, the transceiver module 701 may be configured to perform all sending and receiving operations performed by the retimer in the embodiments shown in FIG. 6, FIG. 7A to FIG. 7D, FIG. 13A, FIG. 13B, FIG. 14A, FIG. 14B, or FIG. 15, and/or configured to support another process of the technology described in this specification. The processing module 702 may be configured to perform all operations performed by the retimer in the embodiments shown in FIG. 6, FIG. 7A to FIG. 7D, FIG. 13A, FIG. 13B, FIG. 14A, FIG. 14B, or FIG.

15, except the sending and receiving operations, and/or another process used to support the technology described in this specification.

The transceiver module 701 may include a sending module and/or a receiving module, which are respectively configured to perform sending and receiving operations performed by the retimer in the embodiments shown in FIG. 6, FIG. 7A to FIG. 7D, FIG. 13A, FIG. 13B, FIG. 14A, FIG. 14B, or FIG. 15. The path control apparatus includes:

a transceiver module, configured to receive a first bitstream sent by a first device, where the first bitstream includes a first field; and a processing module, configured to write capability information into the first field to obtain a second bitstream, where the capability information indicates whether a retimer supports a low latency path, and a low latency path is a path with lowest latency in data transmission paths of the retimer.

The transceiver module is further configured to send the second bitstream to a second device.

The transceiver module is further configured to receive a third bitstream sent by the second device, where the third bitstream includes a second field, and the second field includes first enter control information.

The processing module is further configured to determine, based on the first enter control information, whether to enter the low latency path.

With reference to the foregoing solution, the second field further includes first exit control information, and the processing module is further configured to determine, based on the first exit control information, whether to exit the low latency path.

With reference to the foregoing solution, the transceiver module is further configured to receive a fourth bitstream sent by the second device, where the fourth bitstream includes a third field. The processing module is further configured to write the capability information into the third field to obtain a fifth bitstream. The transceiver module is further configured to: send the fifth bitstream to the first device; and receive a sixth bitstream sent by the first device, where the sixth bitstream includes a fourth field, and the fourth field includes second enter control information. The processing module is specifically configured to determine, based on the first enter control information and the second enter control information, whether to enter the low latency path.

With reference to the foregoing solution, the fourth field further includes second exit control information, and the processing module is specifically configured to determine, based on the first exit control information and the second exit control information, whether to exit the low latency path.

With reference to the foregoing solution, the third bitstream further includes a fifth field, and the sixth bitstream further includes a sixth field. The processing module is further configured to write state information into the fifth field to obtain a seventh bitstream, where the state information indicates whether the retimer enters the low latency path or exits the low latency path. The transceiver module is further configured to send the seventh bitstream to the first device. The processing module is further configured to write the state information into the sixth field to obtain an eighth bitstream. The transceiver module is further configured to send the eighth bitstream to the second device.

With reference to the foregoing solution, the first bitstream further includes a seventh field, and the fourth bitstream further includes an eighth field. The writing capability information into the first field to obtain a second bitstream includes: The processing module is specifically configured to: write the capability information into the first field and writing duration information into the seventh field, to obtain the second bitstream, where the duration information indicates consumed duration for the retimer to enter or exit the low latency path; and write the capability information into the third field and write the duration information into the eighth field, to obtain the fifth bitstream.

With reference to the foregoing solution, the transceiver module is further configured to receive a ninth bitstream sent by the second device, where the ninth bitstream includes a ninth field, and the ninth field includes first enable information. The processing module is further configured to determine, based on the first enable information, whether to enable the low latency path.

With reference to the foregoing solution, the transceiver module is further configured to receive a tenth bitstream sent by the first device, where the tenth bitstream includes a tenth field, and the tenth field includes second enable information. The processing module is specifically configured to determine, based on the first enable information and/or the second enable information, whether to enable a low latency path.

Figure 17:
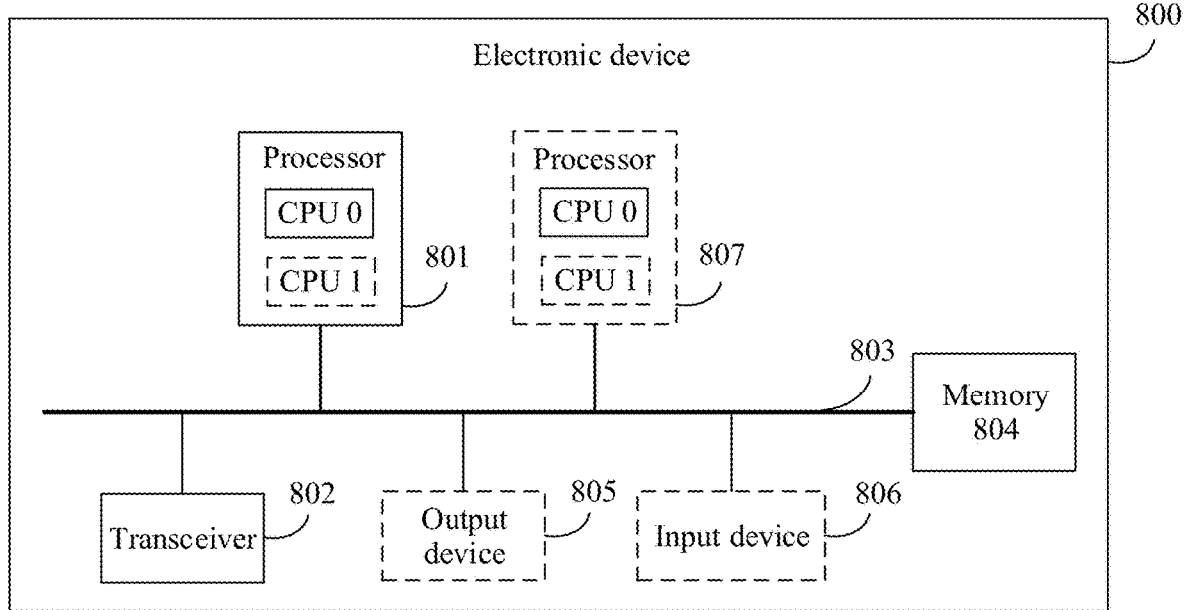
FIG. 17 is a diagram of a structure of an electronic device according to an embodiment of this application.

FIG. 17 is a diagram of a structure of an electronic device according to an embodiment of this application. The electronic device 800 may be a first device, a second device, or a retimer, or may be a chip or a functional module in the first device, the second device, or the retimer. As shown in FIG. 17, the electronic device 800 includes a processor 801, a transceiver 802, and a communication line 803.

The processor 801 is configured to perform any step in the method embodiments shown in FIG. 6, FIG. 7A to FIG. 7D, FIG. 13A, FIG. 13B, FIG. 14A, FIG. 14B, or FIG. 15, and when performing an access process such as sending a first bitstream, may select to invoke the transceiver 802 and the communication line 803 to complete corresponding operations.

Further, the electronic device 800 may further include a memory 804. The processor 801, the memory 804, and the transceiver 802 may be connected through the communication line 803.

The processor 801 is a CPU, a general-purpose processor, a network processor (NP), digital signal processing (DSP), a microprocessor, a microcontroller, a programmable logic device (PLD), or any combination thereof. Alternatively, the processor 801 may be another apparatus having a processing function, for example, a circuit, a component, or a software module. This is not limited.

The transceiver 802 is configured to communicate with another device or another communication network. The another communication network may be an Ethernet, a radio access network (RAN), a wireless local area network (WLAN), or the like. The transceiver 802 may be a module, a circuit, a transceiver, or any apparatus that can implement communication.

The transceiver 802 is configured to receive and send a bitstream, and may include a transmitter and a receiver, which respectively send and receive the bitstream. Operations other than bitstream receiving and sending are implemented by the processor, such as information processing and calculation.

The communication line 803 is configured to transmit information between components included in the electronic device 800.

In a design, the processor may be considered as a logic circuit, and the transceiver may be considered as an interface circuit.

The memory 804 is configured to store instructions. The instructions may be a computer program.

The memory 804 may be a volatile memory or a nonvolatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). The memory 804 may alternatively be a compact disc read-only memory (CD-ROM) or another compact disc storage, an optical disc storage (including a compact disc, a laser disc, an optical disc, a digital versatile disc, a Blu-ray disc, and the like), a magnetic disk storage medium, another magnetic storage device, or the like. It should be noted that the memory of the systems and methods described in this specification includes but is not limited to these and any memory of another proper type.

It should be noted that the memory 804 may exist independently of the processor 801, or may be integrated with the processor 801. The memory 804 may be configured to store instructions, program code, some data, or the like. The memory 804 may be located inside the electronic device 800, or may be located outside the electronic device 800. This is not limited. The processor 801 is configured to execute the instructions stored in the memory 804, to perform the method provided in the foregoing embodiments of this application.

In an example, the processor 801 may include one or more CPUs, for example, a CPU 0 and a CPU 1 in FIG. 17.

Optionally, the electronic device 800 includes a plurality of processors. For example, in addition to the processor 801 in FIG. 17, the electronic device 800 may further include a processor 807.

Optionally, the electronic device 800 further includes an output device 805 and an input device 806. The input device 806 is a device, for example, a keyboard, a mouse, a microphone, or a joystick, and the output device 805 is a device, for example, a display or a speaker.

The electronic device 800 may be a chip system or a device having a structure similar to that in FIG. 17. The chip system may include a chip, or may include a chip and another discrete device. Actions, terms, and the like in embodiments of this application may be mutually referenced. This is not limited. In embodiments of this application, names of messages exchanged between devices, names of parameters in the messages, or the like are merely examples. Other names may alternatively be used during specific implementation. This is not limited. In addition, the composition structure shown in FIG. 17 does not constitute a limitation on the electronic device 800. In addition to the components shown in FIG. 17, the electronic device 800 may include more or fewer components than those shown in FIG. 17, or combine some components, or have different component arrangements.

The processor and the transceiver that are described in this application may be implemented on an integrated circuit (IC), an analog IC, a radio frequency integrated circuit, a hybrid signal IC, an application-specific integrated circuit (ASIC), a printed circuit board (PCB), an electronic device, or the like. The processor and the transceiver may alternatively be manufactured by using various IC process technologies, for example, a complementary metal oxide semiconductor (CMOS), an N-type metal oxide semiconductor (nM et al-oxide-semiconductor, NMOS), a P-type metal oxide semiconductor (positive channel metal oxide semiconductor, PMOS), a bipolar junction transistor (BJT), a bipolar CMOS (BiCMOS), silicon germanium (SiGe), and gallium arsenide (GaAs).

In still another possible implementation, the transceiver module 701 in FIG. 16 may be replaced with a transceiver 802 in FIG. 17, functions of the transceiver module 701 may be integrated into the transceiver 802, the processing module 702 may be replaced with a processor 807, and functions of the processing module 702 may be integrated into the processor 807. Further, the path control apparatus 700 shown in FIG. 16 may further include a memory (not shown in the figure). When the transceiver module 701 is replaced with the transceiver 802, and the processing module 702 is replaced with the processor 807, the path control apparatus 700 in this embodiment of this application may be an electronic device 800 shown in FIG. 17.

Figure 18:
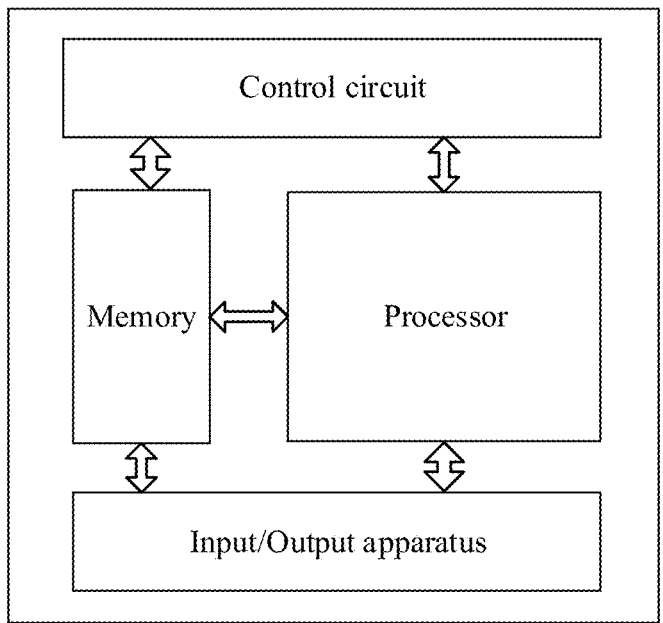
FIG. 18 is a diagram of a structure of a path control apparatus according to an embodiment of this application.

FIG. 18 is a diagram of a structure of a path control apparatus according to an embodiment of this application. The path control apparatus is applicable to the scenario shown in the foregoing method embodiments. For ease of description, FIG. 18 shows only main components of the path control apparatus, including a processor, a memory, a control circuit, and an input/output apparatus. The processor is configured to process a communication protocol and communication data, execute a software program, and process data of the software program. The memory is configured to store the software program and data. The control circuit is configured to supply power and transmit various electrical signals. The input/output apparatus is configured to receive data input by a user and output data to the user.

According to methods provided in embodiments of this application, this application further provides a computer program product. The computer program product includes computer program code. When the computer program code is run on a computer, the computer is enabled to perform a method according to any one of embodiments of this application.

Embodiments of this application further provide a computer-readable storage medium. All or some of the procedures in the foregoing method embodiments may be implemented by a computer or an apparatus having an information processing capability by executing a computer program or instructions to control related hardware. The computer program or the group of instructions may be stored in the computer-readable storage medium. When the computer program or the group of instructions are executed, the procedures of the foregoing method embodiments may be included. The computer-readable storage medium may be an internal storage unit of the first device, the second device, or the retimer in any one of the foregoing embodiments, for example, a hard disk or a memory of each of the foregoing devices. The computer-readable storage medium may alternatively be an external storage device of the devices, for example, a removable hard disk, a smart media card (SMC), a secure digital (SD) card, a flash card, or the like that is provided on the devices. Further, the foregoing computer-readable storage medium may include both the internal storage unit and the external storage device of the devices. The foregoing computer-readable storage medium is configured to store the computer program or the instructions and other programs and data that are necessary for the foregoing device. The computer-readable storage medium may be further configured to temporarily store data that has been output or is to be output.

It will be appreciated that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It will be appreciated that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, function units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, technical solutions in this application may be implemented in a form of a software product. The computer software product is stored in a storage medium and includes several instructions for instructing a computer device (a personal computer, a server, a network device, or the like) to perform all or a part of the steps of methods in embodiments of this application. The foregoing storage medium includes any medium that can store program code, such as a Universal Serial Bus (USB) flash drive, a removable hard disk, a read-only memory (ROM), a random access memory (RAM), a magnetic disk, or an optical disc.

The foregoing descriptions are merely example implementations of this application, but are not intended to limit the protection scope of this application. Any variation or replacement readily figured out by a person skilled in the art within the technical scope disclosed in this application may fall within the protection scope of this application.

What is claimed is:

1. A retimer path control method for wired serial data transmission, wherein the method comprises:

receiving, by a path control apparatus, a first bitstream, wherein the first bitstream comprises a first field, wherein the first field comprises capability information of a retimer, and wherein the capability information indicates whether the retimer supports a low latency path; and sending, by the path control apparatus, a second bitstream to the retimer, wherein the second bitstream comprises a second field, wherein the second field comprises first enter control information, wherein the first enter control information indicates whether the retimer is to enter the low latency path, and wherein the low latency path is a path with lowest latency in data transmission paths of the retimer;

wherein the second bitstream further comprises a fifth field, wherein the fifth field carries state information, and wherein the state information indicates whether the retimer has entered the low latency path or has exited the low latency path.

2. The method according to claim 1, wherein the second field further comprises first exit control information, and the first exit control information indicates whether the retimer is to exit the low latency path.

3. The method according to claim 1, further comprising:

sending a third bitstream to the retimer, wherein the third bitstream comprises a third field, and the third field carries the capability information.

4. The method according to claim 3, further comprising:

receiving a fourth bitstream, wherein the fourth bitstream comprises a fourth field, wherein the fourth field comprises second enter control information and second exit control information, wherein the second enter control information indicates whether the retimer is to enter the low latency path, and wherein the second exit control information indicates whether the retimer is to exit the low latency path.

5. The method according to claim 4, wherein the fourth bitstream further comprises a sixth field, and the sixth field comprises the state information.

6. The method according to claim 5, further comprising:

sending service data to a peer device through the retimer based on determining, based on the state information, that the retimer has not entered the low latency path or has exited the low latency path.

7. The method according to claim 4, wherein the first bitstream further comprises a seventh field, wherein the seventh field comprises duration information, and wherein the duration information indicates a consumed duration for the retimer to enter or exit the low latency path.

8. The method according to claim 7, wherein after sending the second bitstream to the retimer, the method further comprises:

determining a waiting duration based on the duration information; and sending service data to a peer device through the retimer based on a first quantity of fourth bitstreams being received after the waiting duration following a start moment.

9. The method according to claim 4, further comprising:

sending a fifth bitstream to the retimer, wherein the fifth bitstream comprises an eighth field, wherein the eighth field comprises first enable information, and wherein the first enable information indicates whether the retimer is to enable the low latency path.

10. The method according to claim 9, further comprising:

receiving a sixth bitstream, wherein the sixth bitstream comprises a ninth field, wherein the ninth field comprises second enable information, and wherein the second enable information indicates whether to enable the low latency path.

11. The method according to claim 10, wherein the method further comprises:

based on the second enable information being different from the first enable information, updating the first enable information based on the second enable information, to obtain updated first enable information, wherein the updated first enable information is the same as the second enable information; and sending an updated fifth bitstream to the retimer, wherein the updated fifth bitstream comprises an updated first enable field, and the updated first enable field comprises the updated first enable information.

12. A retimer path control method for wired serial data transmission, wherein the method comprises:

receiving, by a path control apparatus, a first bitstream from a first device, wherein the first bitstream comprises a first field;

writing, by the path control apparatus, capability information into the first field to obtain a second bitstream, wherein the capability information indicates whether a retimer supports a low latency path, and the low latency path is a path with lowest latency in data transmission paths of the retimer;

sending, by the path control apparatus, the second bitstream to a second device;

receiving, by the path control apparatus, a third bitstream sent by the second device, wherein the third bitstream comprises a second field, and the second field comprises first enter control information and first exit control information;

determining, by the path control apparatus, based on the first enter control information, whether to enter the low latency path; and determining, by the path control apparatus, based on the first exit control information, whether to exit the low latency path;

wherein the method further comprises:

receiving, by the path control apparatus, a fourth bitstream from the second device, wherein the fourth bitstream comprises a third field;

writing, by the path control apparatus, the capability information into the third field to obtain a fifth bitstream;

sending, by the path control apparatus, the fifth bitstream to the first device; and receiving, by the path control apparatus, a sixth bitstream sent by the first device, wherein the sixth bitstream comprises a fourth field, and the fourth field comprises second enter control information;

wherein determining whether to enter the low latency path is further based on the second enter control information.

13. The method according to claim 12, wherein the fourth field further comprises second exit control information; and

wherein determining whether to exit the low latency path comprises is further based on the second exit control information.

14. The method according to claim 12, wherein the third bitstream further comprises a fifth field, wherein the sixth bitstream further comprises a sixth field, and wherein the method further comprises:

writing state information into the fifth field to obtain a seventh bitstream, wherein the state information indicates whether the retimer has entered the low latency path or has exited the low latency path;

sending the seventh bitstream to the first device;

writing the state information into the sixth field to obtain an eighth bitstream; and sending the eighth bitstream to the second device.

15. The method according to claim 12, wherein the first bitstream further comprises a seventh field, and the fourth bitstream further comprises an eighth field;

wherein obtaining the second bitstream further comprises:

writing duration information into the seventh field, wherein the duration information indicates a consumed duration for the retimer to enter or exit the low latency path; and wherein obtaining the fifth bitstream further comprises:

writing the duration information into the eighth field.

16. The method according to claim 12, further comprising:

receiving a ninth bitstream from the second device, wherein the ninth bitstream comprises a ninth field, and the ninth field comprises first enable information; and determining, based on the first enable information, whether to enable the low latency path.

17. A path control apparatus for wired serial data transmission, comprising:

one or more processors; and a memory, configured to store one or more computer programs or instructions;

wherein execution of the one or more computer programs or the instructions by the one or more processors facilitates performance of the following by the path control apparatus:

receiving a first bitstream, wherein the first bitstream comprises a first field, wherein the first field comprises capability information of a retimer, and wherein the capability information indicates whether the retimer supports a low latency path; and sending a second bitstream to the retimer, wherein the second bitstream comprises a second field, wherein the second field comprises first enter control information, wherein the first enter control information indicates whether the retimer is to enter the low latency path, and wherein the low latency path is a path with lowest latency in data transmission paths of the retimer;

wherein the second bitstream further comprises a fifth field, wherein the fifth field carries state information, and wherein the state information indicates whether the retimer has entered the low latency path or has exited the low latency path.

18. The path control apparatus according to claim 17, wherein the second field further comprises first exit control information, and the first exit control information indicates whether the retimer is to exit the low latency path.

19. The path control apparatus according to claim 17, wherein execution of the one or more computer programs or the instructions by the one or more processors further facilitates performance of the following by the path control apparatus:

sending a third bitstream to the retimer, wherein the third bitstream comprises a third field, and the third field carries the capability information.

20. The path control apparatus according to claim 17, wherein execution of the one or more computer programs or the instructions by the one or more processors further facilitates performance of the following by the path control apparatus:

receiving a fourth bitstream, wherein the fourth bitstream comprises a fourth field, wherein the fourth field comprises second enter control information and second exit control information, wherein the second enter control information indicates whether the retimer is to enter the low latency path, and wherein the second exit control information indicates whether the retimer is to exit the low latency path.

\*    \*    \*    \*    \*